(12) United States Patent
Golan et al.

(10) Patent No.: US 8,072,985 B2
(45) Date of Patent: *Dec. 6, 2011

(54) TRAFFIC MATRIX COMPUTATION FOR PACKET NETWORKS

(75) Inventors: Joseph Golan, Ocean, NJ (US);
Danielle Liu, Holmdel, NJ (US); Joseph Thomas O'Neil, Staten Island, NY (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/647,528

(22) Filed: Dec. 27, 2009

(65) Prior Publication Data

US 2010/0097938 A1    Apr. 22, 2010

Related U.S. Application Data

(63) Continuation of application No. 11/239,785, filed on Sep. 29, 2005, now Pat. No. 7,664,114, which is a continuation of application No. 10/016,642, filed on Oct. 30, 2001, now Pat. No. 7,002,960.

(51) Int. Cl.
*H04L 12/56* (2006.01)

(52) U.S. Cl. .................................. 370/395.32

(58) Field of Classification Search .......... 370/389–391, 370/395.2, 395.3–395.32, 395.41–395.43, 370/395.7–395.72, 411–419, 422–423, 429
See application file for complete search history.

(56) References Cited

U.S. PATENT DOCUMENTS

| | | | |
|---|---|---|---|
| 5,157,654 A * | 10/1992 | Cisneros | ......................... 370/414 |
| 5,432,785 A | 7/1995 | Ahmed et al. | |
| 5,450,408 A | 9/1995 | Phaal | |
| 5,539,659 A | 7/1996 | McKee et al. | |
| 5,748,905 A * | 5/1998 | Hauser et al. | ................. 709/249 |
| 5,862,338 A | 1/1999 | Walker et al. | |
| 5,881,237 A | 3/1999 | Schwaller et al. | |
| 5,886,643 A | 3/1999 | Diebboll et al. | |
| 6,115,393 A | 9/2000 | Engel et al. | |
| 6,212,184 B1 | 4/2001 | Venkatachary et al. | |
| 6,229,788 B1 * | 5/2001 | Graves et al. | ................. 370/230 |
| 6,269,393 B1 | 7/2001 | Yost et al. | |

(Continued)

OTHER PUBLICATIONS

Internet Draft Category: Informational Document:: <draft-ieft-psamp-framework-06.txt>; www.ietf.org/proceedings/04aug/ I-D/draft-ietf-psamp-framework-06.txt.

(Continued)

*Primary Examiner* — Thai Hoang

(57) ABSTRACT

Systems in the current art provide capacity planning for packet networks. These systems require input data that characterizes traffic demands. The demands may be expressed as matrixes that record the number of bytes and packets exchanged between access routers or service nodes for each type-of-service. This invention defines a system and method to calculate these traffic matrixes. Access routers in a service node export flow records to a Record Collector. The flow records are processed to create ingress and egress records that are stored on the Record Collector. This data is uploaded to a Capacity Planning Server at which the traffic matrixes are generated. The egress access router(s) for a flow are determined by searching for matching ingress and egress records. Matching records have identical source and destination addresses. This algorithm requires no knowledge of the complex topology and routing protocols that are used within packet networks. Sampled or non-sampled flow records may be used. The concepts in this invention may also be used to calculate traffic matrixes for virtual private networks (VPNs).

16 Claims, 20 Drawing Sheets

U.S. PATENT DOCUMENTS

| | | |
|---|---|---|
| 6,269,398 B1 | 7/2001 | Leong et al. |
| 6,308,148 B1 | 10/2001 | Bruins et al. |
| 6,363,056 B1 | 3/2002 | Beigi et al. |
| 6,397,359 B1 | 5/2002 | Chandra et al. |
| 6,516,417 B1 | 2/2003 | Pegrum et al. |
| 6,751,663 B1 | 6/2004 | Farrell et al. |
| 6,757,742 B1 * | 6/2004 | Viswanath .................... 709/246 |
| 6,763,192 B1 * | 7/2004 | Jagannathan .................... 398/54 |
| 6,785,240 B1 | 8/2004 | Cao et al. |
| 6,895,421 B1 | 5/2005 | Dor et al. |
| 6,925,085 B1 * | 8/2005 | Krishna et al. ........... 370/395.32 |
| 6,950,434 B1 * | 9/2005 | Viswanath et al. ........... 370/392 |
| 7,002,960 B1 * | 2/2006 | Golan et al. ................. 370/393 |
| 7,664,114 B1 * | 2/2010 | Golan et al. ............. 370/395.32 |
| 2002/0032717 A1 | 3/2002 | Malan et al. |
| 2002/0034354 A1 * | 3/2002 | Hayashi et al. .................. 385/17 |
| 2002/0143926 A1 | 10/2002 | Maltz et al. |
| 2002/0165956 A1 | 11/2002 | Phaal |
| 2005/0021748 A1 | 1/2005 | Garcea et al. |

OTHER PUBLICATIONS

Internet Draft Document: <draft-ieft-psamp-sample-tech-03.1xt>; www.ietf.org/proceedings/03nov/I-D/draft-ietf-psamp-sample-tech-03.txt.

Poh, E.C.K.; Hong Tat Ewe; "IPv6 Packet Classification Based on Flow Label, Source and Destination Addresses". Information Technology and Applications, 2005. ICITA 2005. Third International Conference on vol. 2. Jul. 4-7, 2005, pp. 659-664.

* cited by examiner

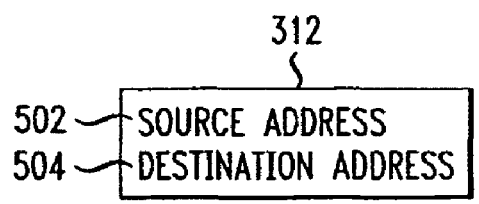
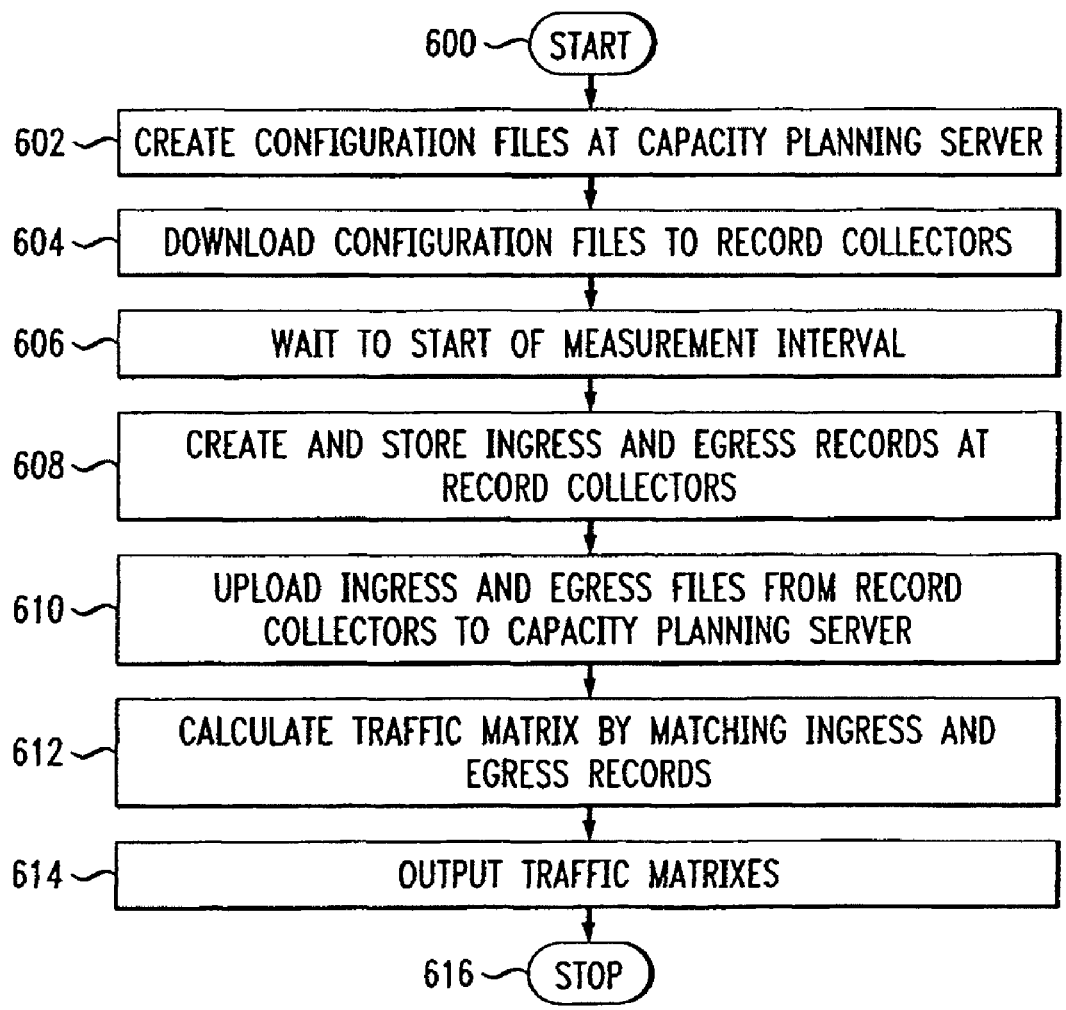

TRAFFIC MATRIX COMPUTATION FOR PACKET NETWORKS

CROSS-REFERENCE TO RELATED APPLICATIONS

This application is a continuation of U.S. patent application Ser. No. 11/239,785, filed Sep. 29, 2005, now U.S. Pat. No. 7,664,114 which is currently allowed and is a continuation of U.S. patent application Ser. No. 10/016,642, filed Oct. 30, 2001, now U.S. Pat. No. 7,002,960. All of the above cited applications are herein incorporated by reference in their entirety.

TECHNICAL FIELD

The present invention relates to capacity planning for packet networks. Specifically, it defines a method to compute traffic matrixes for these networks. The matrixes report the number of bytes and packets that are exchanged among access routers or service nodes. This data is essential input for capacity planning tools.

BACKGROUND OF THE INVENTION

Capacity planning for packet networks is required to provide adequate quality-of-service. A variety of software tools in the current art can be used for this purpose. One vendor that provides such tools is the Wide Area Network Design Laboratory. A description of their products is available at wandl.com. A second vendor is Optimum Network Performance. See opnet.com for more information about their products. Other vendors also exist.

These products require input that describes the traffic demands on a network. This data can be provided as a matrix that shows the number of bytes and packets transmitted between access routers. It is necessary to report this data separately for each type-of-service. A traffic matrix is a three dimensional matrix $T[x][y][z]$ where x is the index of an ingress access router, y is the index of an egress access router, and z is the type-of-service (TOS). The values of x and y range from 0 to the number of access routers−1. The value of z ranges from 0 to the number of types of service−1.

Alternatively, a capacity planning tool may require a traffic matrix that characterizes the number of bytes and packets transmitted between service nodes. A traffic matrix is a three dimensional matrix $T[x][y][z]$ where x is the index of an ingress service node, y is the index of an egress service node, and z is the type-of-service (TOS). The values of x and y range from 0 to the number of service nodes−1. The value of z ranges from 0 to the number of types of service−1.

A variety of protocols are used to route packets. These protocols are defined in specifications at ietf.org. For example, the Open Shortest Path First (OSPF) protocol is used to route within an autonomous system as described in RFC 2328, OSPF Version 2, by J. Moy. The Border Gateway Protocol is used to route among autonomous systems as described in RFC 1771, A Border Gateway Protocol, by Y. Rekhter and T. Li. The Border Gateway Protocol is also described in RFC 1772, Application of the Border Gateway Protocol in the Internet, by Y. Rekhter and P. Gross. The Multi-Protocol Label Switching (MPLS) technology is used for traffic engineering as described in RFC 3031 Multiprotocol Label Switching Architecture by Rosen, et. al.

Virtual Private Networks (VPNs) can also be provided on packet networks. VPNs provide secure connectivity among distributed customer sites. MPLS can also be used to provide Virtual Private Networks (VPNs) as described in RFC 2547, BGP/MPLS VPNs, by Rosen and Rekhter. This is also described in RFC 2917, A Core MPLS IP VPN Architecture, by Muthukrishnan and Malis.

Many books describe these protocols as well. For example, Computer Networks, Third Edition, by A. Tanenbaum, Prentice-Hall, 1996 is an excellent reference text. Routing in the Internet, by Christian Huitema, Prentice Hall, 1995 is also valuable. BGP4 Inter-Domain Routing in the Internet, by John Stewart III, Addison-Wesley, 1999 describes BGP-4. See MPLS: Technology and Applications, by Davie and Rekhter, Morgan Kafmann, 2000 for a discussion of that protocol.

Access routers in the current art can be configured to generate records that provide summary information about packet flows. A flow is a sequence of packets from a source to a destination. An access router identifies a flow by examining the packets that enter and/or exit its interfaces. Packets having identical values for source address/port, destination address/port, protocol, type-of-service, and input interface are considered to be part of the same flow.

Flow records contain multiple items (e.g. source address/port, destination address/port, protocol, type-of-service, input interface, output interface). In addition, an access router counts the number of bytes and packets that comprise this flow and includes these values in the flow record. Flow records provide raw data about packet flows through a network.

An access router is configured to transmit flow records to a specific address and port. This occurs when the flow completes. It may also occur multiple times during a flow.

Cisco is a network equipment vendor that provides flow record generation. This feature on their products is called NetFlow. Each Version 5 NetFlow record contains source IP address, destination IP address, source TCP or UDP port, destination TCP or UDP port, next hop router IP address, incoming interface address or index, outgoing interface address or index, packet count, byte count, start of flow timestamp, end of flow timestamp, IP protocol, type-of-service, TCP flags, source autonomous system, destination autonomous system, source subnet, and destination subnet. Other formats are also available. See cisco.com for a detailed description of this feature.

It is a difficult task to generate traffic matrixes. First, a backbone network that provides connectivity for customer networks may consist of multiple autonomous systems that are connected in a complex topology. There may be alternate paths between a source and destination. Protocols such as OSPF and BGP-4 provide features for load balancing among these alternate paths. Second, the routers that comprise these networks may use a variety of routing protocols. These protocols may have complex interactions. Third, the routing tables can be large. There can be tens of thousands of routes for some protocols such as BGP-4. Fourth, the traffic volumes through a backbone are substantial. Data about packet flows through a router may total several megabytes. Fifth, it can be difficult to determine the best time to measure traffic flows through a backbone network. Traffic may be maximum at some nodes and minimum at others.

SUMMARY OF THE INVENTION

Limitations of the prior art are overcome and a technical advance is achieved by the present invention. It provides a method to generate traffic matrixes for packet networks. The invention is particularly important for backbone networks that provide high-speed connectivity for other networks.

Access routers are located in multiple service nodes. They are configured to generate records for incoming and outgoing flows on external interfaces. These are the interfaces connected to customer networks. Flow records are transmitted to a record collector in each service node. The data is filtered and stored by software on that machine. The records are later uploaded to a capacity planning server. Software at that machine calculates a traffic matrix. The algorithm used for this computation searches for matching flow records from ingress and egress access routers. Matching flow records have identical values for parameters such as source and destination addresses. This algorithm requires no knowledge of the network topology and routing protocols.

Another aspect of this invention generates traffic matrixes by using sampled flow records. Non-sampled flow records require an access router to examine every packet that passes through the device. This can impose a significant processing overhead on the device. To minimize this overhead, a sampling technique can be used. Every M-th packet is analyzed and flows are identified from sampled packets.

A further aspect of this invention generates traffic matrixes for a virtual private network (VPN).

BRIEF DESCRIPTION OF THE DRAWINGS

The above-summarized invention will be more fully understood upon consideration of the following detailed description and the attached drawings wherein:

FIG. 5 shows the format of an egress record.

FIG. 6 is a flowchart for the capacity planning system.

DETAILED DESCRIPTION

The following detailed description and accompanying drawing figures depict illustrative embodiments of the present invention. Those skilled in the art will discern alternative system and method embodiments within the spirit of the present invention, and within the scope of the attached claims, from consideration of the present inventive teachings.

Figure 1:
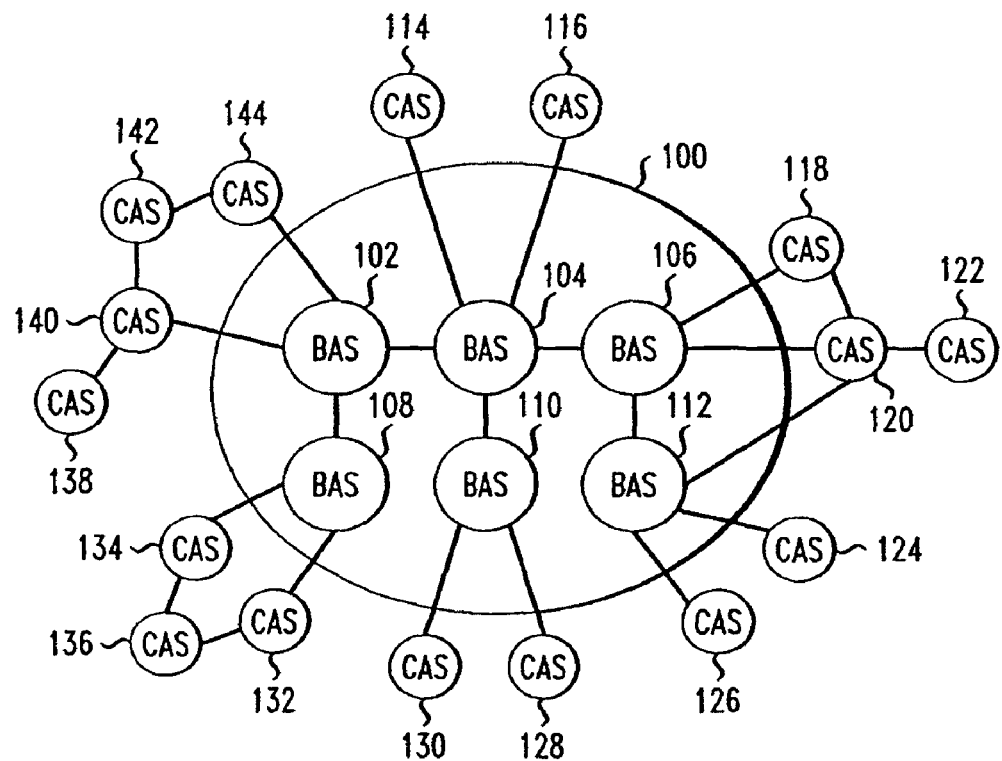
FIG. 1 shows an illustrative backbone network consisting of multiple autonomous systems that connects multiple customer autonomous systems.

FIG. 1 shows an illustrative backbone network 100 in the current art. The backbone network 100 is typically operated by a network provider, such as AT&T Corp., and comprises multiple Backbone Autonomous Systems (BASs) 102-112. Each BAS typically handles communication traffic in a large geographic region (e.g. continent, country, or region) and is managed by a department or organization of the network provider.

The backbone provides connectivity to and among Customer Autonomous Systems (CASs) 114-144. These CASs are typically operated by Internet service providers (ISPs) that provide Internet connectivity for businesses and/or consumers. Connectivity between the customer autonomous systems and the backbone network may be accomplished in a number of different ways. A CAS 114 may connect directly to the backbone. Alternatively, a CAS 122 may connect indirectly to the backbone via a second CAS 120 that may be operated by a different entity than CAS 122. It is also possible that CAS 120 may connect to the backbone at multiple sites.

Figure 2:
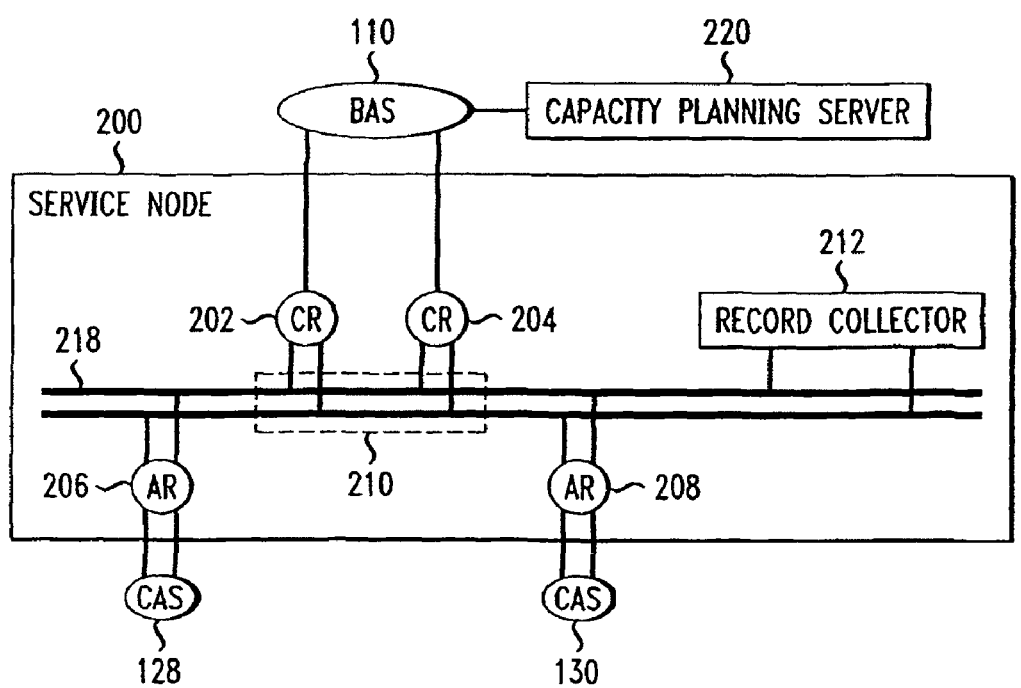
FIG. 2 shows a block diagram of a backbone service node.

The backbone is implemented by routers and switches located in multiple service nodes. Some of these service nodes provide connectivity between backbone and customer autonomous systems. FIG. 2 is a block diagram of a backbone service node 200 that provides such connectivity. CASs 128 and 130 connect to Access Routers (ARs) 206 and 208. These ARs 206 and 208 connect to a Local Area Network (LAN) 218. Also connected to the LAN 218 are Core Routers (CRs) 202 and 204 and a Record Collector 212. The CRs 202 and 204 connect to BAS 110. A Capacity Planning Server 220 connects to BAS 110. A switch 210 may optionally be used to provide connectivity among the ARs 206-208, CRs 202-204, and Record Collector 212.

The ARs are configured to generate flow records for incoming and outgoing flows on external interfaces. These are the interfaces that connect to CASs 128-130.

Figure 3:
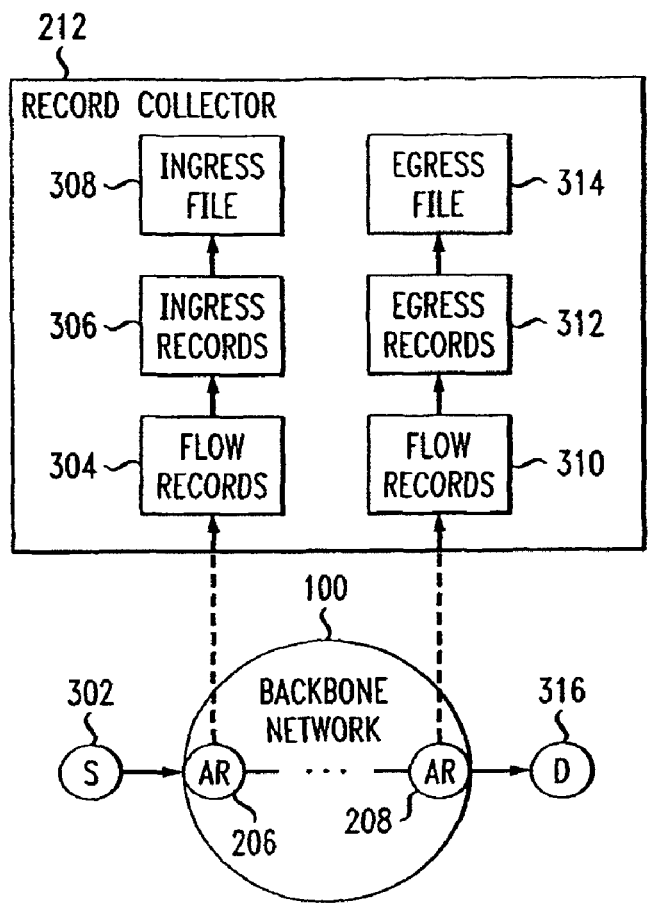
FIG. 3 shows generation of ingress and egress files.

FIG. 3 illustrates how flow records are generated at ingress and egress ARs. Assume that a flow goes from source 302 to destination 316. AR 206 recognizes the incoming flow from source 302 on one of its external interfaces. It stores important information about the flow (e.g. source address/port, destination address/port, type-of-service, input interface, output interface). It also counts the number of bytes and packets that comprise the flow. This data is transmitted from AR 206 to Record Collector 212. Software on the Record Collector 212 receives these flow records 304 and extracts relevant data as described in further detail hereinafter to create ingress records 306. The ingress records 306 are stored in an ingress file 308.

AR 208 recognizes the outgoing flow to destination 316 on one of its external interfaces. It also transmits flow records to Record Collector 212. Software on Record Collector 212 receives these flow records 310 and extracts relevant data as described in detail hereinafter to create egress records 312. The egress records 312 are stored in an egress file 314.

It is important to note that ARs 206 and 208 may export different numbers of flow records for the same flow. This is because each AR contains a fixed size buffer in which it records the cumulative byte and packet counts for each active flow. If this buffer is not sufficient to contain the counts for all active flows, the data for the oldest flow is exported as a flow record. This is done to allocate buffer space for the newest flow. Furthermore, transmission of these flow records is not synchronized in time.

Figure 4:
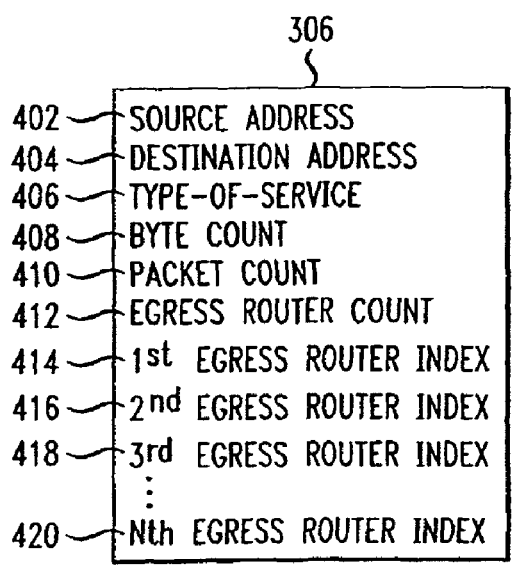
FIG. 4 shows the format of an ingress record.

FIG. 4 represents an exemplary data file for an ingress record 306. It contains source address 402, destination address 404, type-of-service 406, byte count 408, and packet count 410. The source address 402 uniquely identifies the source 302 of a flow. The destination address 404 uniquely identifies the destination 316 of a flow. The type-of-service 406 characterizes the real-time requirements of the flow. For example, a flow may carry streaming audio and video. This would be high priority traffic. A flow may carry a file transfer. This would be low priority traffic.

The format of the source address 402, destination address 404, and type-of-service 406 depend on the specific technology that is used to implement the network. For example, Internet Protocol Version 4 uses 32 bits for addressing and provides four bits for a priority field. Internet Protocol Version 6 uses 128 bits for addressing and provides eight bits for a class field. More information regarding these protocols may be found on the IETF website, ietf.org, which is incorporated by reference.

The byte count 408 and packet count 410 indicate the number of bytes and packets that are reported by this flow record, respectively. An AR may export multiple flow records for a flow. Each of these records reports the number of bytes and packets for its portion of the flow.

The egress router count 412 is initialized to zero. This element designates the number of egress router indexes that are contained in this specific ingress record. Ingress and egress records are processed as described in detail hereinafter. As egress routers are identified for a flow, the indexes for these egress routers are appended to the ingress record 306 and the egress router count 412 is incremented. Each AR has a unique index between 0 and the number of ARs–1. Further discussion about the egress router count 412 is contained later in this document.

The volume of flow records transmitted from ARs is substantial. It is not practical for a Record Collector 212 to store an ingress record 306 or egress record 312 for every flow record it receives. It is also not practical to upload such a quantity of data from every Record Collector 212 to the Capacity Planning Server 220. Therefore, the user of the Capacity Planning Server 220 must specify measurement intervals for which a traffic matrix is to be generated.

A measurement interval may correspond to a particular date and time (e.g. between 12:00 PM and 12:15 PM Greenwich Mean Time on Jul. 30, 2001). Alternatively, a measurement interval may be recurring, for example occur weekly, (e.g. between 15:30 PM and 15:45 PM Greenwich Mean Time every Friday). The interval should be large enough so representative data can be collected. However, it should be small enough so storage and processing requirements for the ingress and egress records is not excessive.

FIG. 5 represents an exemplary data file for an egress record 312. It contains source address 502 and destination address 504. The description of source and destination addresses given for an ingress record 306 also applies to the elements of an egress record 312.

Figure 7:
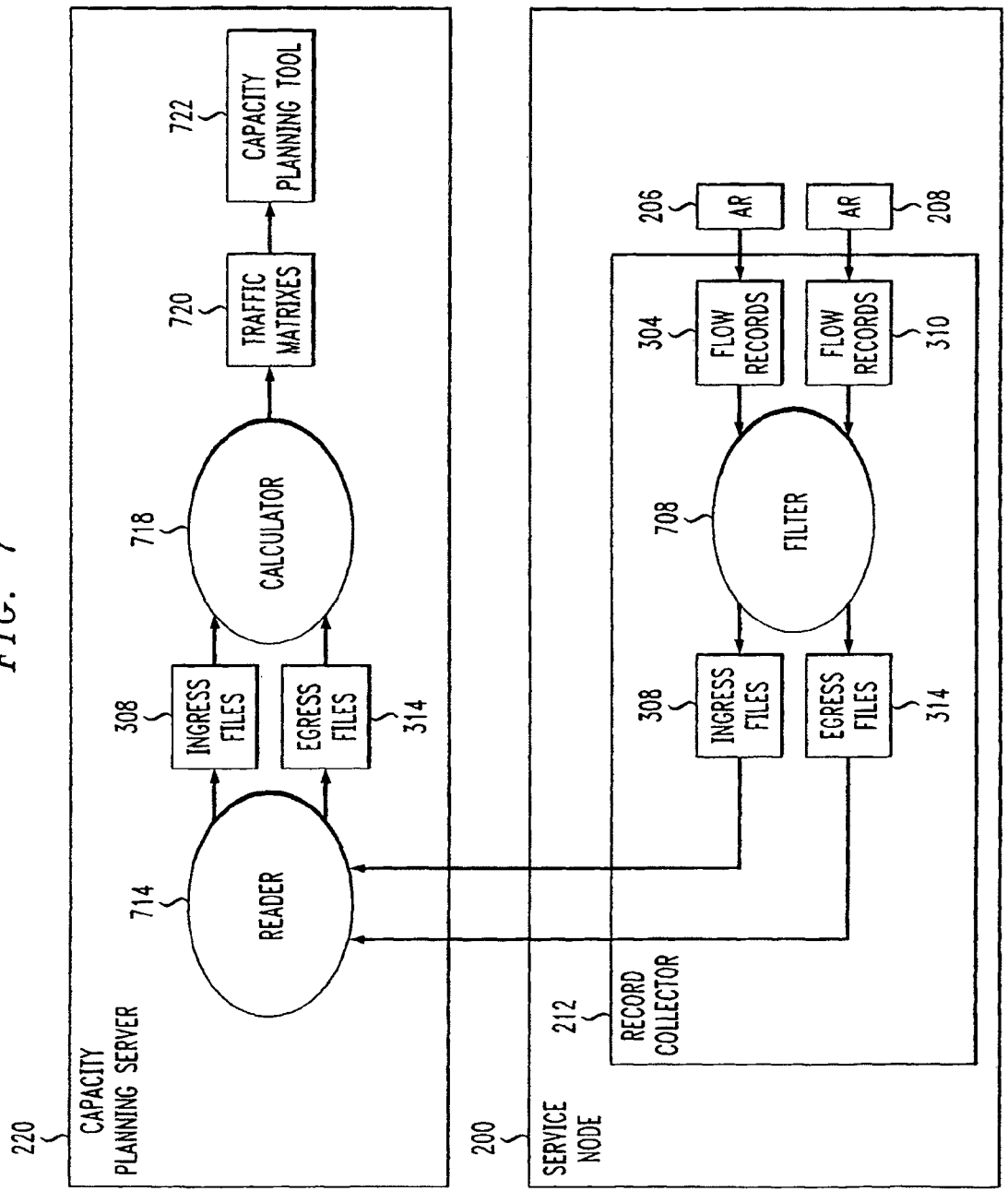
FIG. 7 is functional block diagram of the capacity planning system.

FIGS. 6 and 7 discuss the Capacity Planning System. FIG. 6 shows the flowchart for the Capacity Planning System. Execution starts at 600. Configuration files are created on the Capacity Planning Server 220 (step 602). The contents and format of these files are described later in this specification. The configuration files are downloaded to the Record Collectors 212 (step 604). The system then waits for the start of a measurement interval (step 606). Ingress and egress records are created and stored on the Record Collectors 212 (step 608). Files containing these ingress and egress records are uploaded from the Record Collectors 212 to the Capacity Planning Server 220 (step 610). This data is used to calculate the traffic matrix by matching the ingress and egress records (step 612). This algorithm is described later in this document. The traffic matrix is output (step 614). Execution stops at 616.

FIG. 7 is a functional block diagram of the Capacity Planning System. The diagram shows the software processes that are used on the Record Collectors 212 and Capacity Planning Server 220. While only one Record Collector 212 is illustrated in FIG. 7, it is to be understood that multiple Record Collectors may be distributed across the network without departing from the scope and spirit of the present invention. Each Record Collector 212 contains a Filter 708. The Capacity Planning Server 220 contains a Reader 714 and a Calculator 718. The traffic matrixes 720 generated by the Calculator 718 are input to the Capacity Planning Tool 722. The following paragraphs describe how these software components operate.

Multiple service nodes provide access to the backbone network. An exemplary service node is illustrated in FIG. 7 for purposes of describing the present invention. Each service node 200 contains multiple ARs 206-208 that export flow records 304-310 to the Filter 708 on the Record Collector 212. The Filter 708 extracts source address, destination address, type-of-service, byte count, and packet count from each flow record to create ingress records. Each ingress record is written to an ingress file 308. The Filter 708 extracts source address and destination address from each flow record to create egress records. Each egress record is written to an egress file 314.

After a measurement interval concludes, the Filter 708 on each Record Collector 212 notifies the Reader 714 on the Capacity Planning Server 220 that data is available for upload. The Reader 714 moves the ingress files 308 and egress files 314 to the Capacity Planning Server 220.

The Reader 714 then initiates a Calculator 718 to process the ingress files 308 and egress files 314. The Calculator matches ingress and egress records. Matching records are those for which the source and destination addresses are identical. In this manner, the egress router(s) for a flow are determined. Each ingress record 306 is annotated when an egress router is identified for the flow. When all ingress and egress records have been matched, the Calculator 718 computes and outputs the computed traffic matrixes 720. These files can then used as input to the Capacity Planning Tool 722.

Figure 8A:
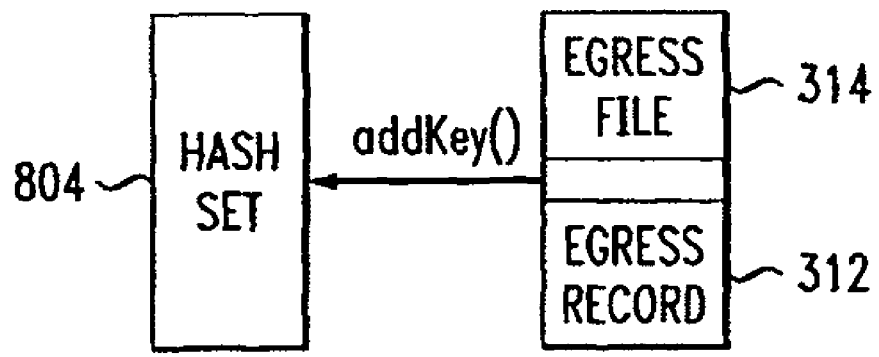
FIGS. 8A and 8B show how a hash set is created from egress records and how a hash set is checked for a match with an ingress record.

FIG. 8A illustrates how the Calculator 718 processes an egress file 314. A key is computed for each egress record 312. Its purpose is to uniquely identify the egress record 312. The key is computed by concatenating the source and destination addresses. The value is entered into a hash set 804. The same key is generated for all egress records that contain the same source and destination addresses.

A hash set is a data structure that enables efficient searching for a value. See The Art of Computer Programming, Volume 3, by D. E. Knuth, Addison-Wesley, 1997 which is incorporated by reference. An implementation of a hash set is available in the Java class libraries at java.sun.com. See the documentation for class java.util.HashSet. This class provides a method addKey( ) that can be used to add an entry to the hash set.

Figure 8B:
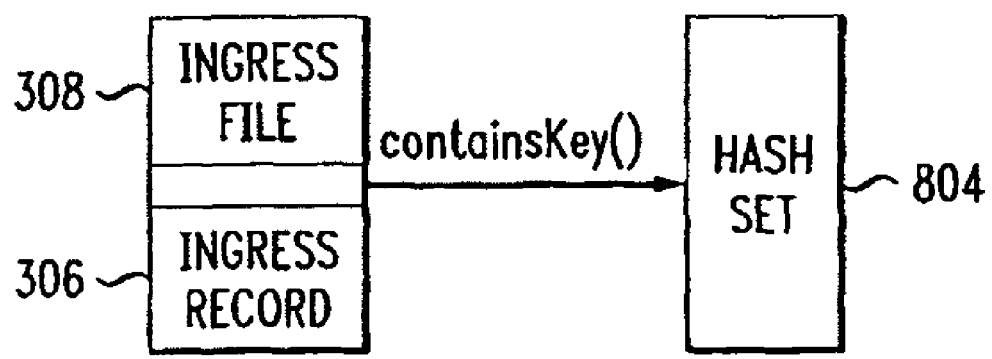

FIG. 8B illustrates how an ingress file 308 is searched. A key is computed for each ingress record 306. This key is computed by concatenating the source and destination addresses. The hash set is then searched for that key. The class java.util.HashSet provides a method containsKey( ) that tests if the hash set contains the key.

In this manner, the egress routers(s) for each flow are determined. A flow may exit from the backbone at multiple routers if broadcast or multicast capabilities are used. The algorithm uses the hash set 804 to efficiently search for egress and ingress records that have matching values for source and destination addresses. After all egress and ingress files have been processed, each ingress record has been annotated with the indexes of all egress routers(s) for that flow.

Figure 9A:
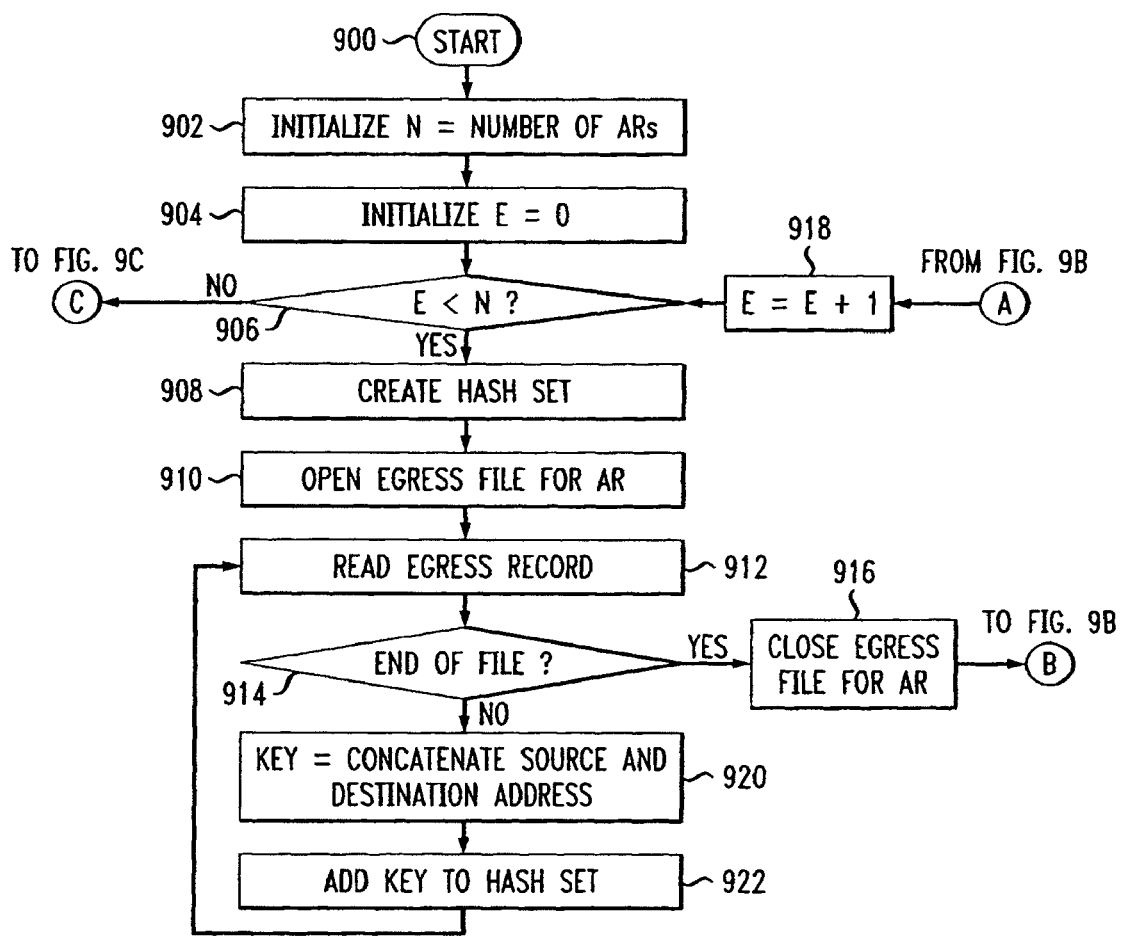
FIGS. 9A-9D are flowcharts for the Calculator process.

FIG. 9A shows how the Calculator 718 processes each egress file. Execution starts at 900. Variable N is initialized to the number of ARs (step 902). Variable E is initialized to zero (step 904). Variable E is the index to an AR. Each AR has a unique index between 0 and the number of ARs−1. Variables E and N are compared (step 906). If E is not less than N, this means that all egress files have been processed. Execution proceeds to point C (FIG. 9C). If E is less than N, this means that not all egress files have been processed and a hash set is created for the egress records for the AR with index E (step 908). The egress file for AR with index E is opened (step 910). An egress record is read from the file (step 912). An end-of-file check is done (step 914). If this check fails, a key is computed from the source and destination addresses in the egress record (step 920). The resulting key is added to the hash set (step 922). Steps 912-922 are repeated until all egress records have been read from the file. Once all the egress records have been read from the file, the egress file for the AR with index E is closed (step 916) and execution continues at point B.

Figure 9B:
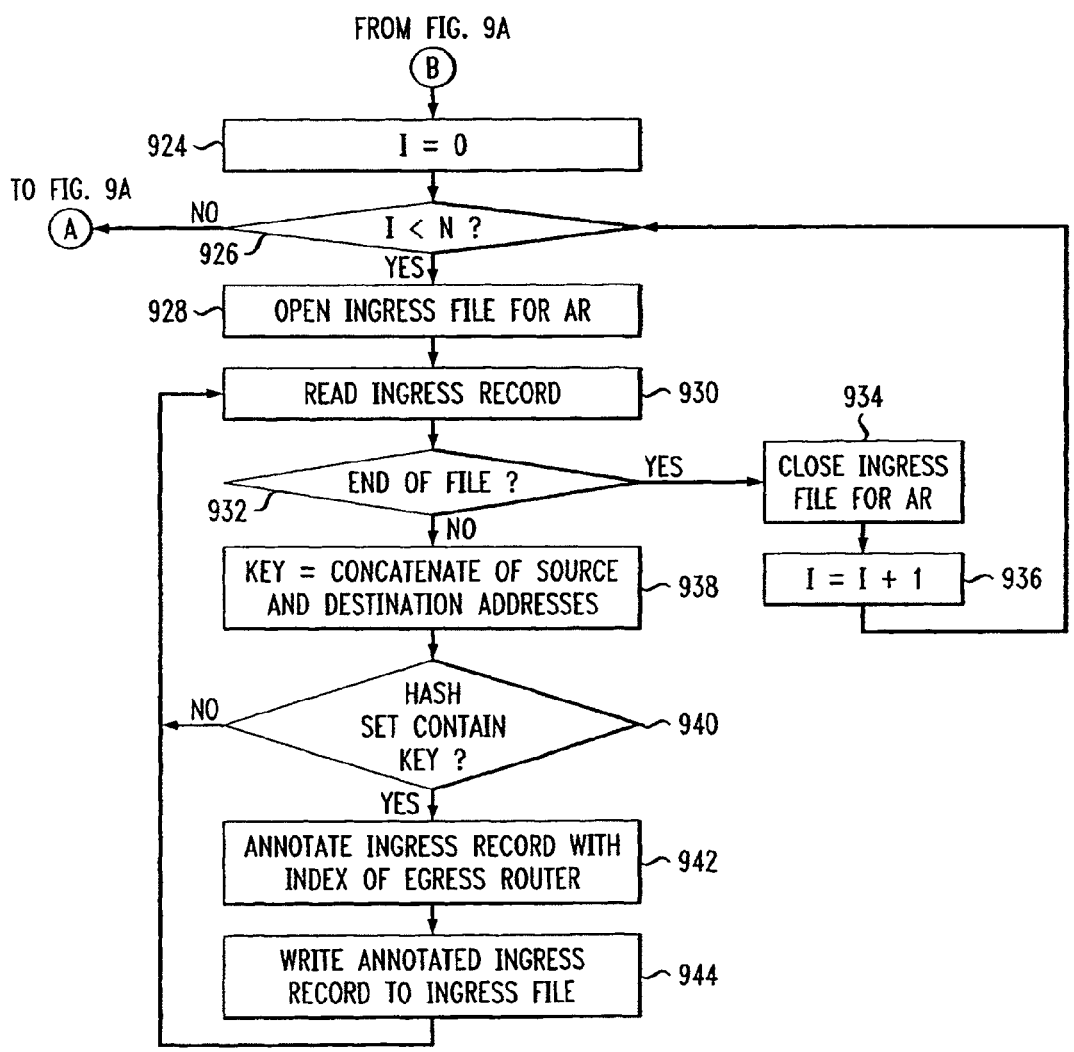
Figure 9C:
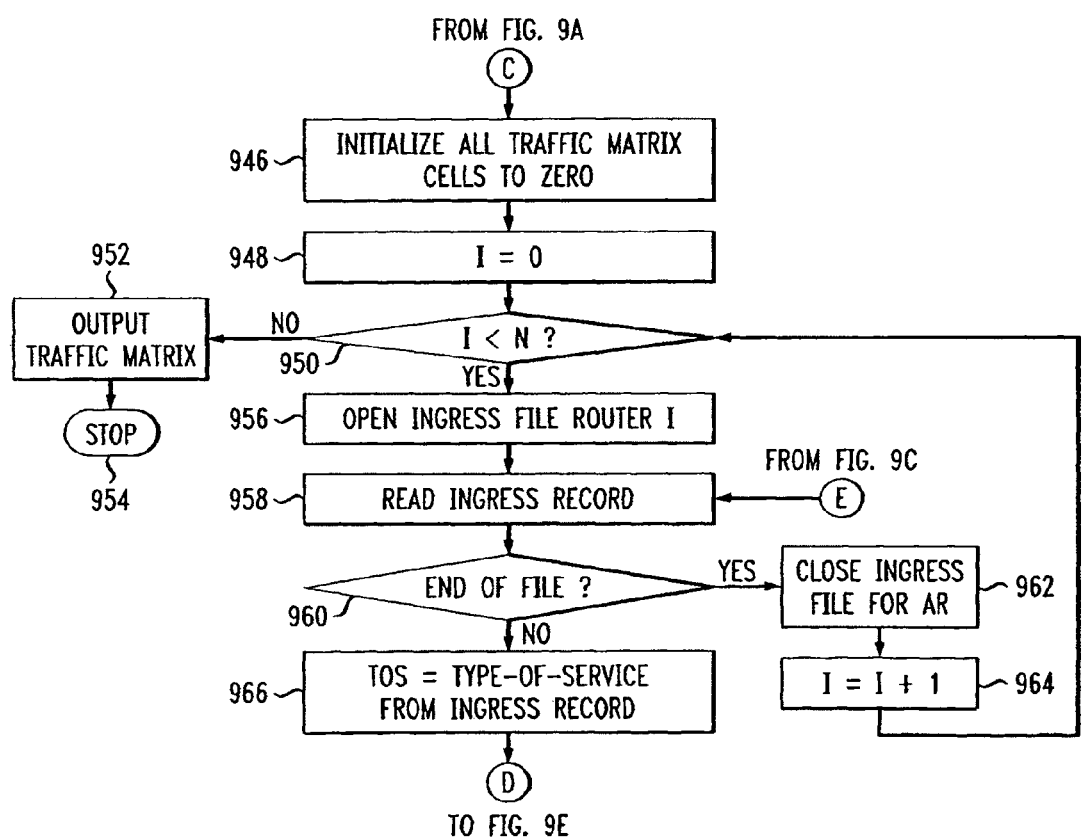

FIG. 9B shows how the Calculator 718 processes each ingress file. Execution begins at point B. Variable I is initialized to zero (step 924). Variable I is the index to an AR. Each AR has a unique index between 0 and the number of ARs−1. Variables I and N are compared (step 926). If I is not less than N, this means that all ingress files have been processed. Execution proceeds to point A. If I is less than N, this means that not all ingress files have been processed and the ingress file for AR with index I is opened (step 928). An ingress record is read from the file (step 930). An end-of-file check is done (step 932). If this test fails, a key is computed from the source and destination addresses in the ingress record (step 938). The hash set is then checked to determine if it contains the key (step 940). If no, execution proceeds to step 930. Otherwise, the ingress record is annotated with the index of the egress router (step 942). The annotated ingress record is written to the ingress file (step 944). Execution proceeds to 930. The check at 932 succeeds after all records have been read from the file. The file is closed (step 934) and variable I is incremented (step 936). Execution continues at 926.

FIG. 9C shows how the Calculator 718 generates a traffic matrix. Execution begins at point C. All traffic matrix cells are initialized to zero (step 946). Variable I is initialized to zero (step 948). Variable I is the index to an AR. Each access router has a unique index between 0 and the number of ARs−1. Variables I and N are compared (step 950). If I is less than N, this means that not all ingress files have been processed. The ingress file for the AR with index I is opened (step 956). An ingress record is read from the file (step 958). An end-of-file check is done (step 960). If this test fails, the type-of-service value is read from the ingress record (step 966). Execution proceeds to point D. If the test at 960 succeeds, the ingress file is closed (step 962) and variable I is incremented (step 964). Execution proceeds to 950. If the test fails, all ingress files have been processed. The traffic matrix is output (step 952). Execution stops at 954.

Figure 9D:
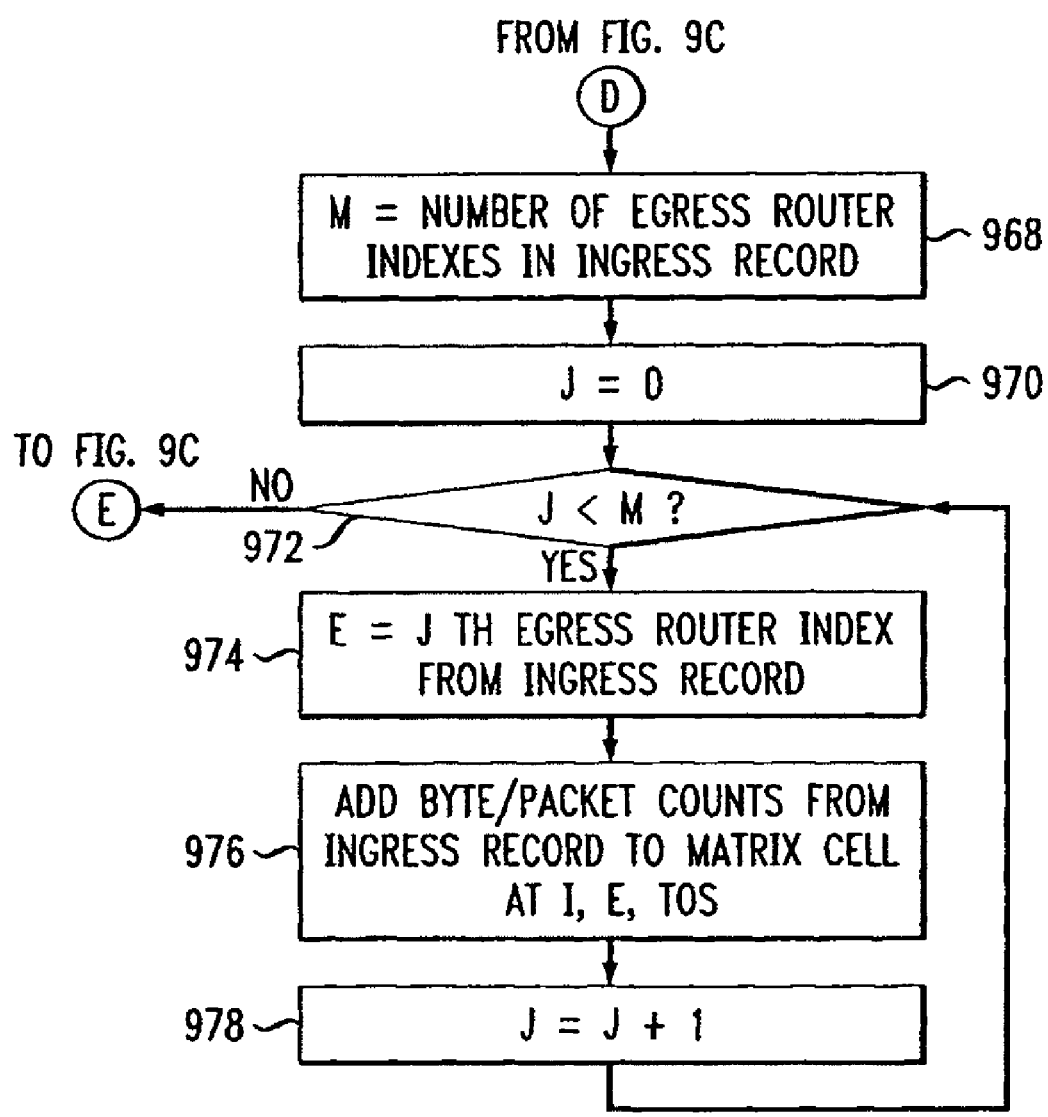

FIG. 9D also shows how the Calculator 718 generates the traffic matrix. Execution begins at point D. Variable M is initialized to the number of egress router indexes in the ingress record (step 968). Variable J is initialized to zero (step 970). Variable J is used as the index to the egress router indexes in the ingress record. Variables J and M are compared (step 972). If J is less than M, this means that not all egress routers have been processed. Variable E is initialized to the J-th egress router index from the ingress record (step 974). The byte and packet counts from the ingress record are added to the matrix cell whose indexes are I (the ingress router index), E (the egress router index), and TOS (the type-of-service) (step 976). Variable J is incremented (step 978) and execution proceeds to 972. If J is not less than M (step 972), this means that all egress routers identified in the ingress record have been processed. Execution proceeds to point E.

Figure 10:
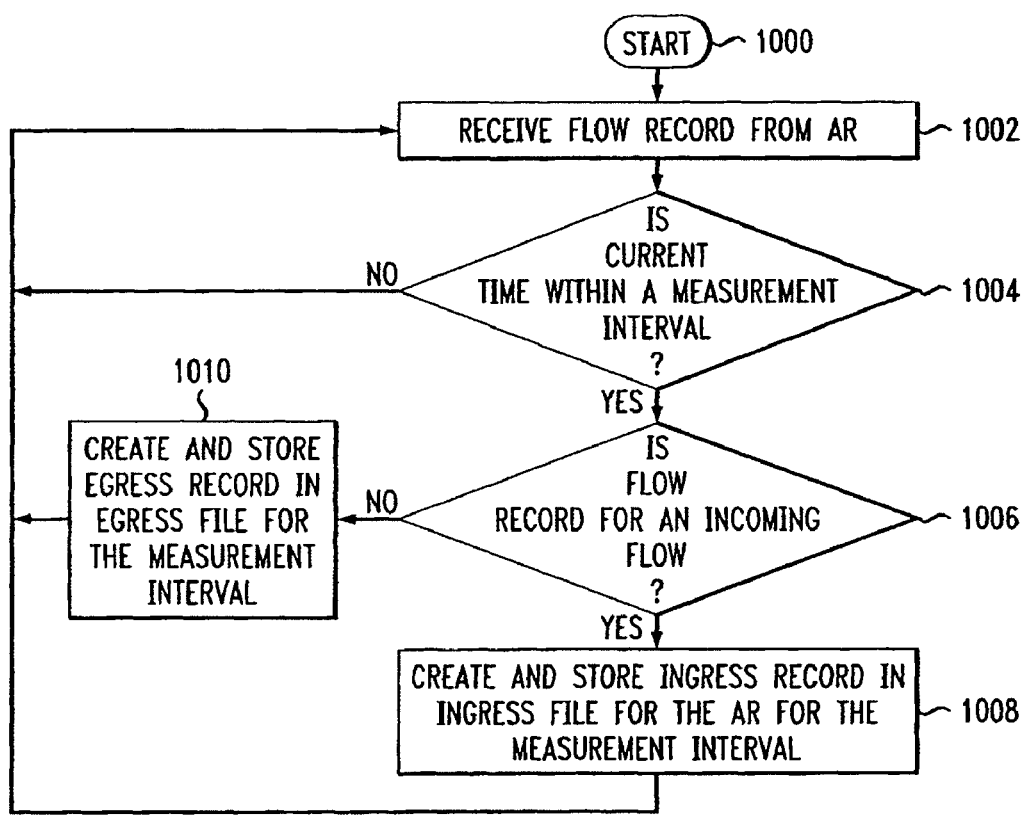
FIGS. 10-11 are flowcharts for the Filter process.

FIG. 10 shows how the Filter 708 processes flow records that are exported by ARs 206-208. Execution starts (step 1000) and a flow record is received from an AR (step 1002). A check is made to determine if the current time is within a measurement interval (step 1004). If no, the flow record is discarded and the filter waits to receive another flow record from an AR (step 1002). If the current time is within a measurement interval, a check is made to determine if the flow record is for an incoming flow (step 1006). Data from the flow record (viz. incoming interface address or index, outgoing interface address or index) and a configuration file is used to make this decision. The configuration file is discussed later in this specification. If the flow record is for an incoming flow, an ingress record 306 is created and stored in an ingress file 308 for the AR (step 1008). If the flow record is not for an incoming flow, an egress record 312 is created and stored in an egress file 314 for the AR (step 1010). In either case, the filter waits to receive another flow record from an AR (step 1002).

Figure 11:
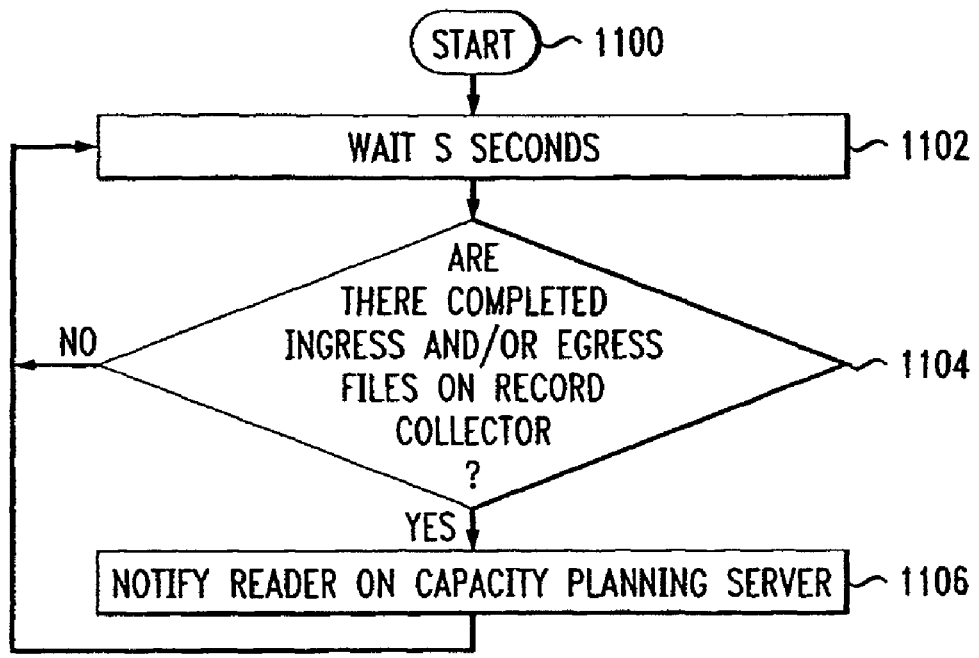

FIG. 11 shows how the Filter 708 notifies the Reader 714 after a measurement interval concludes. Execution starts (step 1100) and the software waits for S seconds (step 1102). The value of S determines the frequency at which the Filter 708 periodically notifies the Reader 714. Its value is fixed. A check is made to determine if there are ingress and/or egress files on the Record Collector 212 (step 1104). If no, the software waits another S seconds (step 1102). If there are ingress and/or egress files on Record Collector 212, the Reader 714 is notified that data is available on the Record Collector 212 (step 1106). The software then waits another S seconds (step 1102) to do another check (step 1104).

Figure 12:
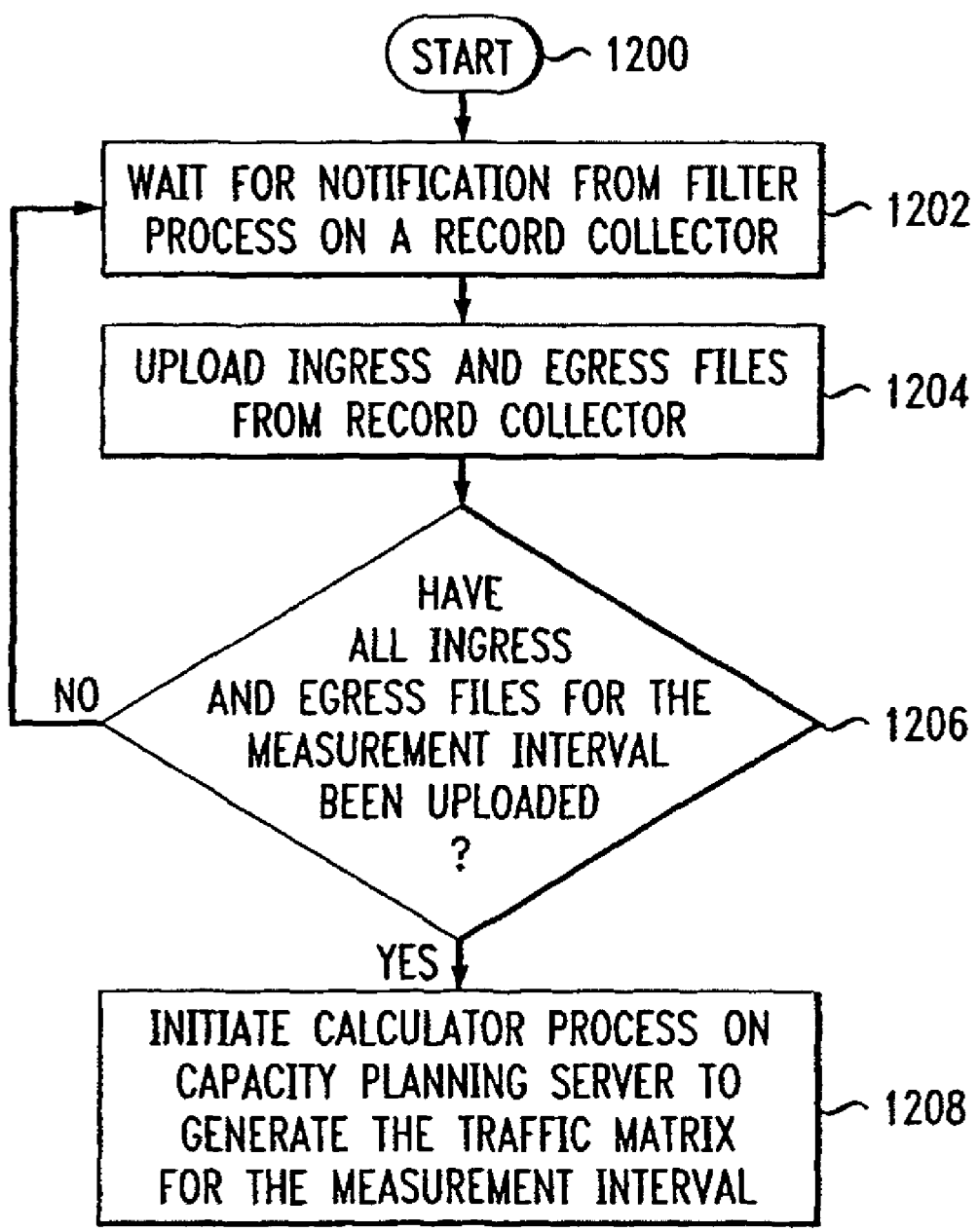
FIG. 12 is a flowchart for the Reader process.

FIG. 12 shows how the Reader 714 processes notifications from a Filter 708. Execution starts (step 1200) and the software waits for notification from the Filter 708 (step 1202). The ingress and egress files are uploaded from the Record Collector 212 (step 1204). A check is made to determine if all ingress and egress files for the measurement interval have been uploaded from all Record Collectors 212 (step 1206). If no, to the software waits for notification from the Filter (step 1202). If all of the ingress and egress files for the measurement interval have been uploaded from all Record Collectors, a Calculator 718 is initiated to generate a traffic matrix for the measurement interval (step 1208).

Three configuration files are required for this system. This specification uses the Extensible Markup Language (XML) to format these files. Additional details relating to XML can be found at xml.org which is incorporated by reference. It is to be understood by those skilled in the art that other techniques could also be used without departing from the scope and spirit of the present invention.

The files are schedule.xml, nodes.xml, and interfaces.xml. The first file defines the start time and duration of measurement intervals for which traffic matrixes must be computed. The second file specifies names and addresses of the Capacity Planning Server 220, Record Collectors 212, and ARs 206-208. The third file identifies the external interfaces of ARs 206-208.

Figure 13:
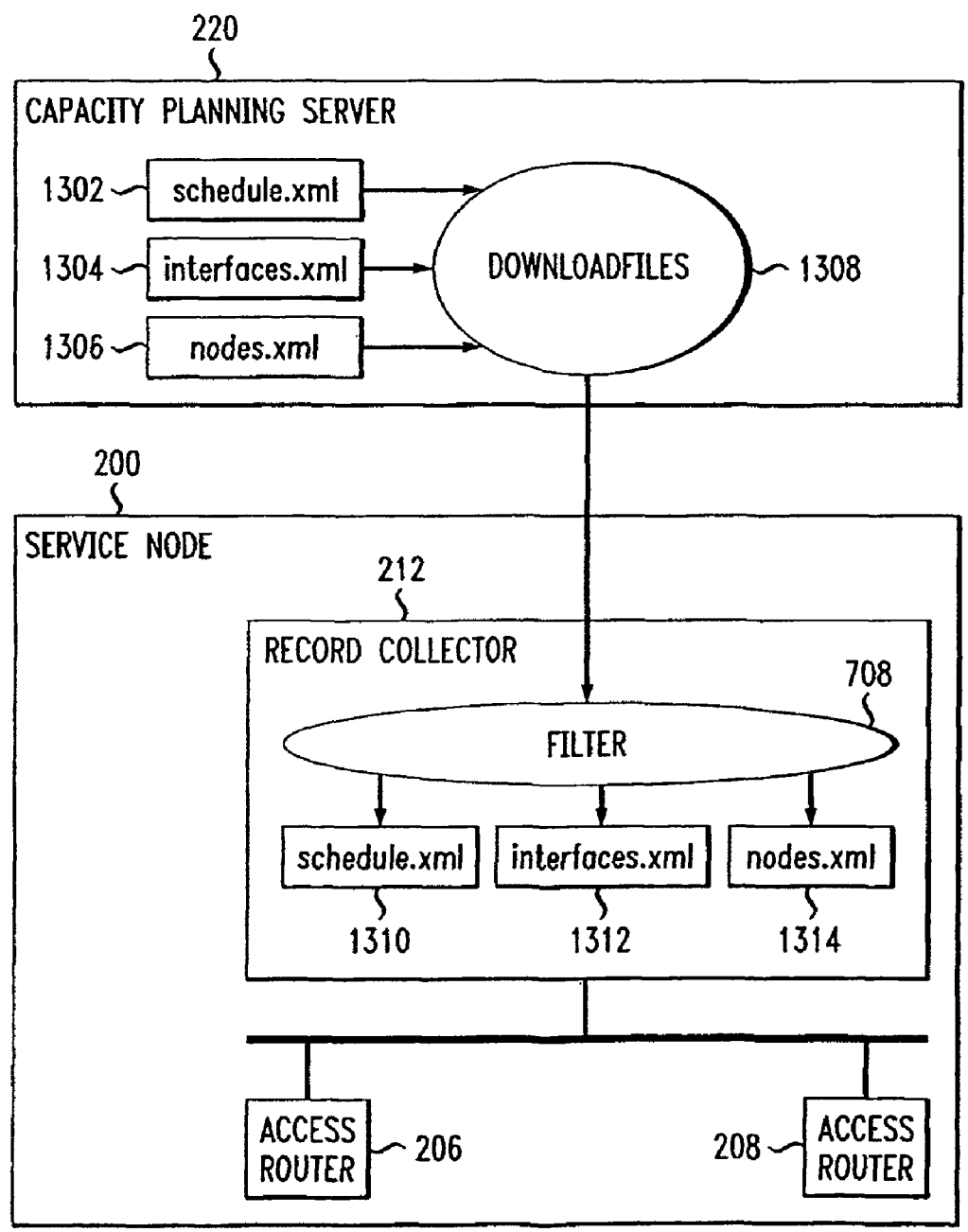
FIG. 13 illustrates how XML files containing configuration data are downloaded to Record Collectors in service nodes.

FIG. 13 shows how the files schedule.xml 1302, interfaces.xml 1304, and nodes.xml 1306 are downloaded from the Capacity Planning Server 220 to the Filter 708 on a Record Collector 212. A user invokes a software tool DownloadFiles 1308 to initiate this download. The Files 708 receives this data and creates files schedule.xml 1310, interfaces.xml 1312, and nodes.xml 1314 on the Record Collector 212.

A sample file for schedule.xml is shown in the following listing. It defines two measurement intervals for which traffic matrixes are generated. The first measurement interval starts every Monday at 12:00 Greenwich Mean Time. The duration of the interval is 15 minutes. The second measurement interval starts at 4 Jul. 2001 at 22:00 Greenwich Mean Time. The duration of the interval is 20 minutes. The Filter 708 needs this information to determine when ingress and egress files should be created.

```
<schedule>
    <measurement-interval/>
        Mon-12:00-GMT, 15 minutes
    <measurement-interval/>
        04-Jul-01-22:00-GMT, 20 minutes
</schedule>
```

A sample file for nodes.xml is shown in the following listing. It first specifies the address of the Capacity Planning Server 220. It then provides data about the Record Collector 212 and access routers 206-208 in each service node 200. For each service node 200, the name and address of the Record Collector 212 and the name and loopback address of each access router 206-208 are specified. In this example, the address of the Capacity Planning Server 220 is 249.249.249.249. The name and address of the Record Collector 212 are New York and 250.250.250.250. The names of the access routers 206-208 are Manhattan and Brooklyn. Their loopback addresses are 251.251.251.151 and 252.252.252.252, respectively. The Filter 708 needs the information about the Capacity Planning Server 220 so it can transmit notifications to the Reader 714. The Filter 708 needs the information about the access routers 206-208 to name the egress and ingress files it creates.

```
<nodes>
    <capacity-planning-server>
        <capacity-planning-server-address/>249.249.249.249
    </capacity-planning-server>
    <node>
        <record-collector>
            <record-collector-name/>New York
            <record-collector-address/>250.250.250.250
        </record-collector>
        <access-router>
            <access-router-name/>Manhattan
            <access-router-loopback/>251.251.251.251
        </access-router>
        <access-router>
            <access-router-name/>Brooklyn
            <access-router-loopback/>252.252.252.252
        </access-router>
    </node>
</nodes>
```

A sample interfaces.xml is shown in the following listing. It identifies the external interfaces of each access router 206-208. External interfaces are those that connect to customer networks. Each interface has a unique SNMP (Simple Network Management Protocol) identifier that is assigned by the access router. In this example, the interfaces with SNMP identifiers 1, 2, 3, and 4 are external interfaces on the access router named Manhattan. The interfaces with SNMP identifiers 10, 11, 12, and 13 are external interfaces on the access router named Brooklyn. The Filter 708 needs the information about the external interfaces so it can determine if a flow is incoming or outgoing.

```
<interfaces>
    <access-router>
        <access-router-name/>Manhattan
        <external-interfaces/>1, 2, 3, 4
    </access-router>
    <access-router>
        <access-router-name/>Brooklyn
        <external-interfaces/>10, 11, 12, 13
    </access-router>
</interfaces>
```

The index associated with each access router is determined by its sequence in the interfaces.xml file. The first access router has an index equal to 0. The last access router has an index equal to the number of access routers−1.

A second embodiment of this invention uses sampled flow records to calculate a traffic matrix. To generate a flow record for every flow on an interface, an access router must analyze every incoming or outgoing packet on that interface. This can impose a significant processing overhead. To minimize this overhead, a sampling technique can be used. Every M-th packet is analyzed and flows are identified from sampled packets. The byte and packet counts reported by the access router are adjusted accordingly (i.e. multiplied by M).

However, if sampled flow records are used, there may not be a matching egress record for an ingress record. Therefore, the Calculator 718 is enhanced to post-process the generated traffic matrixes. It assumes that unmatched flows are distributed among egress routers in the same proportions as matched flows.

Figure 14:
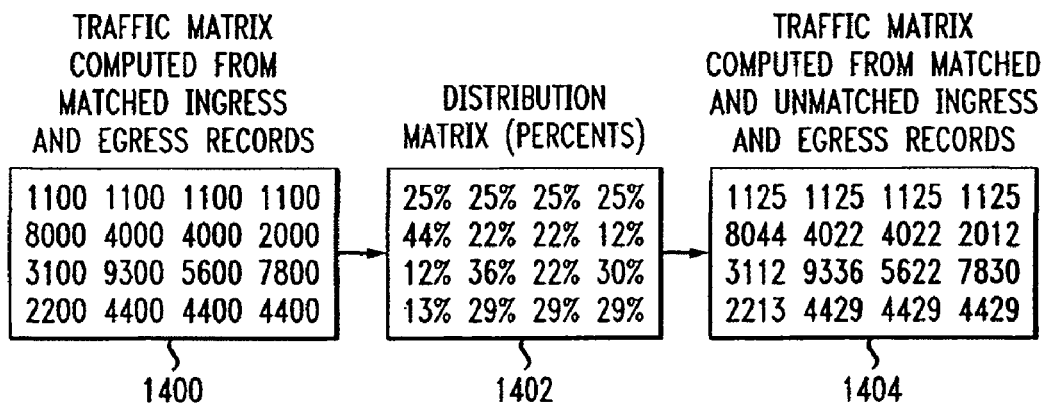
FIG. 14 shows how a distribution matrix is generated and used.

FIG. 14 illustrates how unmatched flows are distributed among egress routers in the same proportions as matched flows.

First, a traffic matrix 1400 is computed from matched ingress and egress records. This is done according to the techniques described for the first embodiment of this invention. Each matrix element represents the number of packets transmitted from an ingress router to an egress router. Each row of the matrix represents an ingress router. The row index equals the index of the ingress router. Each column of the matrix represents an egress router. The column index equals the index of the egress router. For example, a total of 1100 packets were transmitted from the ingress router with index equal to 0 to the egress router with index equal to 0.

Second, a distribution matrix 1402 is computed by using the data in traffic matrix 1400. The distribution matrix 1402 shows how traffic entering each AR is distributed among all ARs. Each row in the distribution matrix is expressed in percent values. For example, the traffic entering the ingress router with index equal to 0 is uniformly distributed to all egress routers. The traffic entering the ingress router with index equal to 1 is distributed to the four egress routers according to the proportions 44%, 22%, 22%, and 12%. Each of these values is calculated in two steps. All elements in the second row of traffic matrix 1400 are added together. The total is 18000. Each element in the second row of the traffic matrix 1400 is divided by the total. This gives the values shown in the second row of the distribution matrix 1402. The logic to calculate the remaining rows in the distribution matrix 1402 is similar.

Third, the unmatched ingress records are distributed according to the percentage values in the distribution matrix 1402. Unmatched ingress records are those that have not been annotated with the index of any egress router. The resulting values are added to the traffic matrix 1400 to obtain a traffic matrix 1404 that shows the exchange of both matched and unmatched records. The values shown in the traffic matrix 1404 are calculated by assuming that there are 100 unmatched ingress records from each access router.

Figure 15A:
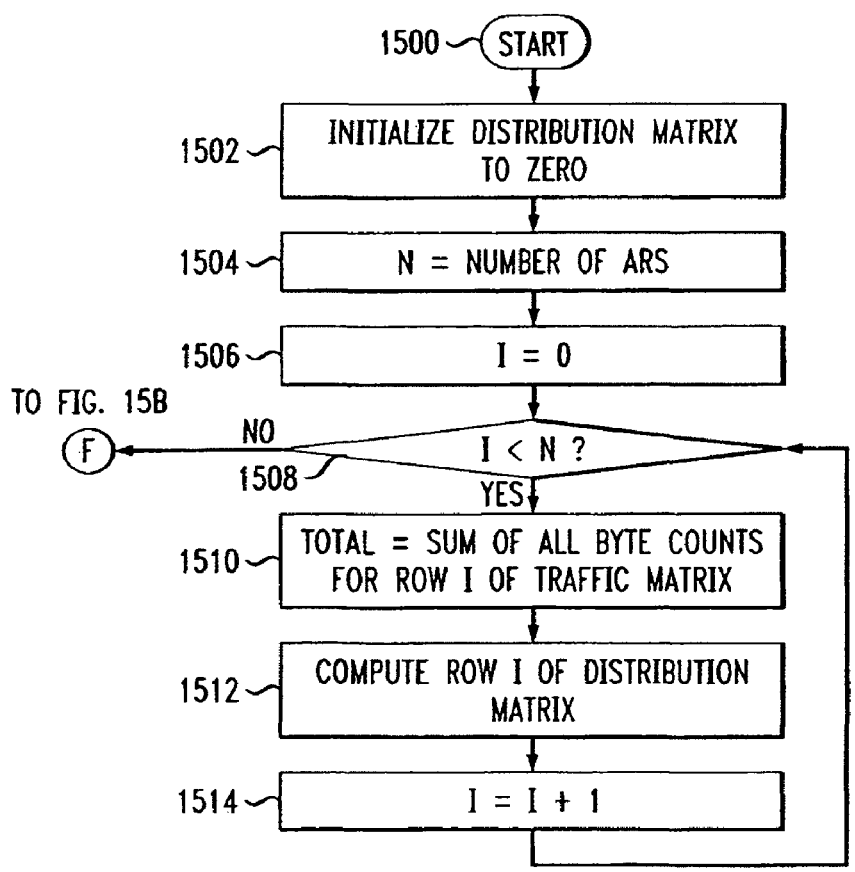
FIGS. 15A-15B are flowcharts for an enhanced Calculator process.

FIG. 15A shows the post-processing done by the Calculator 718. Execution starts (step 1500) and the distribution matrix is initialized to zero (step 1502). Variable N is initialized to the number of ARs (step 1504). Variable I is initialized to zero (step 1506). Variable I is the index to an ingress router. Variables I and N are compared (step 1508). If I is less than N, this means that not all rows of the matrix have been processed, and the total byte count for all entries in row I of the traffic matrix is computed (step 1510). Row I of the distribution matrix is computed (step 1512). This is done by dividing each element of the traffic matrix by the total number of bytes or packets in the corresponding row of the traffic matrix. Variable I is incremented (step 1514) and variable I is again compared to variable N (step 1508). If variable I is greater than the value of variable N, this indicates that all rows of the distribution matrix have been computed. Execution proceeds to point F.

Figure 15B:
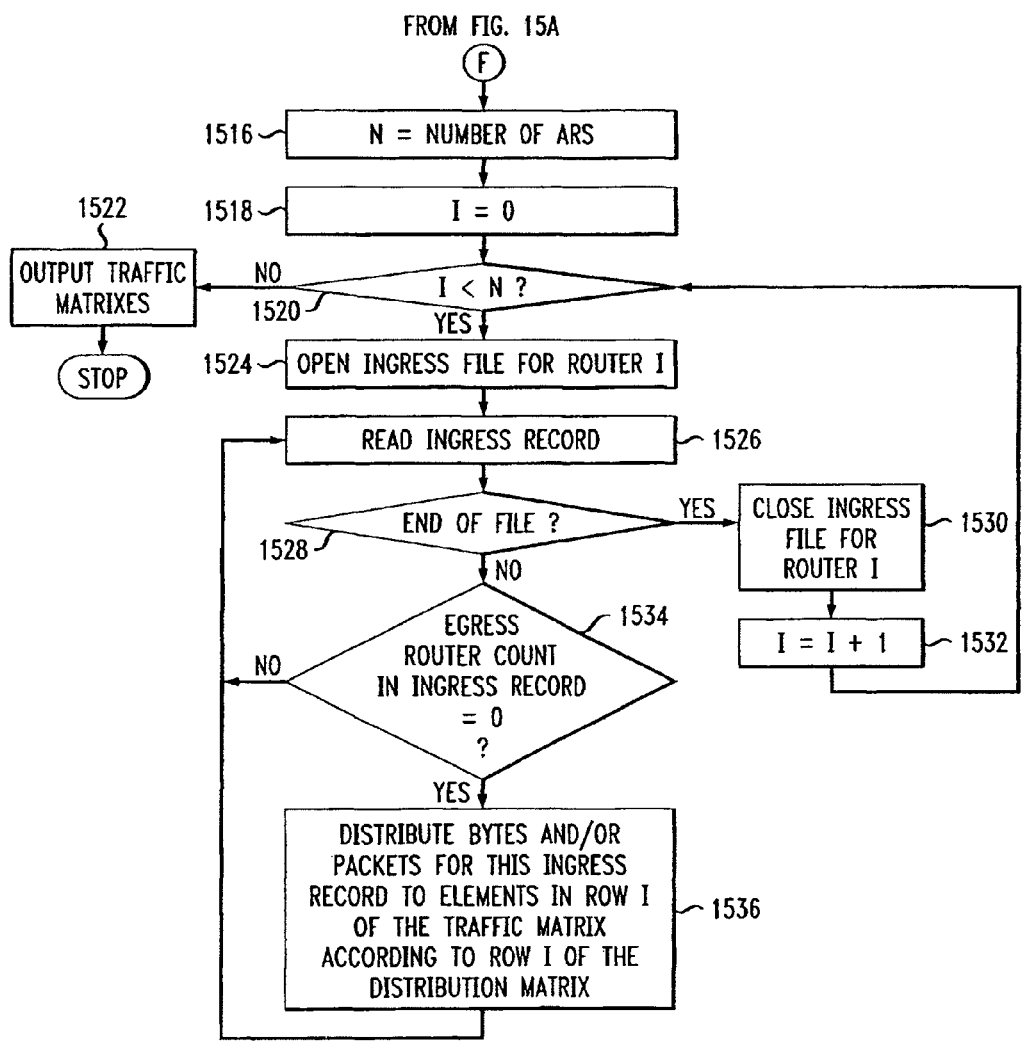

FIG. 15B also shows the post-processing done by the Calculator 718. Execution begins at point F. Variable N is initialized to the number of ARs (step 1516). Variable I is initialized to zero (step 1518). Variables I and N are compared (step 1520). If I is less than N, this means that not all ingress files have been processed, and the ingress file for the router with index I is opened (step 1524). An ingress record is read from the file (step 1526). An end-of-file check is done (step 1528). If this check fails, a check is made to determine if the egress router count in the ingress record equals zero (step 1534). If this end of file check succeeds, this means that egress devices were not identified for this flow, and the bytes and packets for this ingress record are distributed to elements in row I of the traffic matrix according to the percentage values in row I of the distribution matrix (step 1536). Another ingress record is read (step 1526). If the end of file check succeeds, the ingress file for router I is closed (step 1530). Variable I is incremented (step 1532) and variable I is again compared to variable N (step 1520). If the egress router count in the ingress record does not equal zero, another ingress record is read (step 1526).

The first and second embodiments of this invention use schedule.xml to define the start and duration of measurement intervals. A third embodiment of the present invention automatically selects measurement intervals for which a matrix should be generated. For example, the system can compute a matrix each day at the peak traffic interval for a specific access router (or set of access routers). Factors such as the traffic load on a communications link or the CPU load on a router can be considered when selecting a measurement interval. Historical data such as the byte and packet totals reported by the Filter 708 to the Reader 714 can be used to identify times of peak traffic. Faults reported by network elements may also be used to identify intervals when a traffic matrix should be generated. Other factors of interest to the users may also be used and are within the scope of this invention.

Thresholds can be configured to define relevant parameters. Some examples of thresholds are: total traffic on specific interfaces of specific network elements, incoming traffic on specific interfaces of specific network elements, outgoing traffic on specific interfaces of specific network elements, total traffic at specific service nodes, incoming traffic at specific service nodes, outgoing traffic at specific service nodes, total traffic in specific autonomous systems, and total traffic in specific virtual private networks (VPNs).

Referring back to FIG. 7, the Filter 708 and Reader 714 are enhanced for this embodiment. The Filter 708 generates ingress and egress files on a continuous basis (e.g. every 15 minutes). It reports the total byte and packet counts for each interval to the Reader 714. The Reader 714 determines if a matrix should be computed for that interval. If no, the Reader 714 deletes the ingress files 308 and egress files 314 on the Record Collector 212. If yes, the Reader 714 uploads those files to the Capacity Planning Server 220 and then deletes the files.

A sample schedule.xml for this embodiment is shown in the following listing. It indicates that ingress and egress files must be generated on a continuous basis every 15 minutes.

```
<schedule>
    <measurement-interval/>
        Continuous, 15 minutes
</schedule>
```

Figure 16:
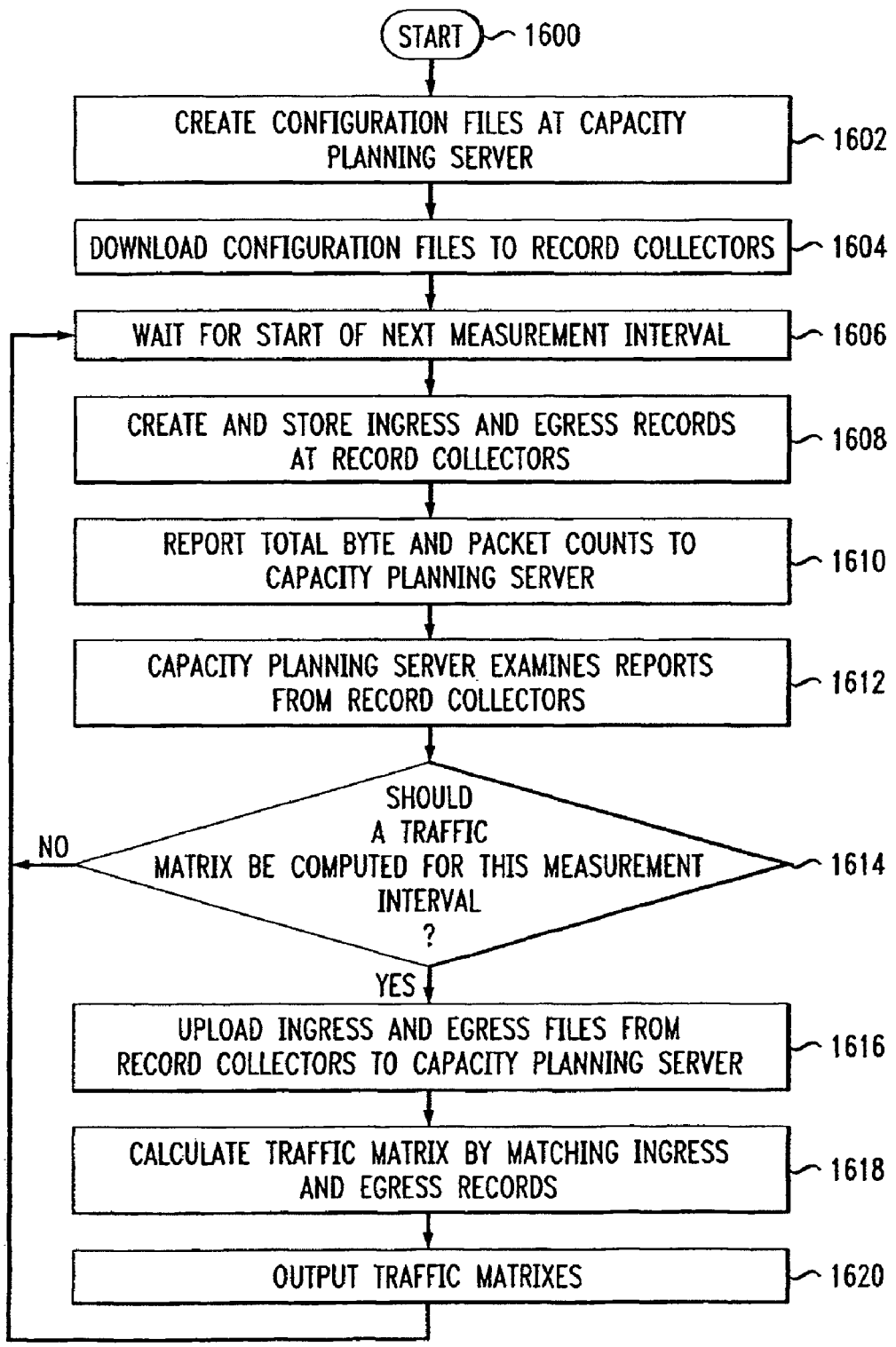
FIG. 16 is the system flowchart for the third embodiment.

FIG. 16 shows the system flowchart for this embodiment. Execution starts (step 1600) and configuration files are created on the Capacity Planning Server (step 1602). These files are downloaded to the Record Collectors (step 1604). The system waits for the start of the next measurement interval (step 1606). Ingress and egress records are created and stored on the Record Collectors (step 1608). The total byte and packet counts for the interval are reported to the Capacity Planning Server (step 1610). The Reader 714 examines these reports from the Filter 708 (step 1612) and determines if a traffic matrix should be calculated (step 1614). If a traffic matrix is not to be calculated, to the system waits for the start of the next measurement interval (step 1606). If a traffic matrix is to be calculated, the ingress and egress files for the interval are uploaded to the Capacity Planning Server (step 1616). The traffic matrix is calculated (step 1618) and output (step 1620). Execution proceeds to step 1606 to wait for another measurement interval.

Figure 17:
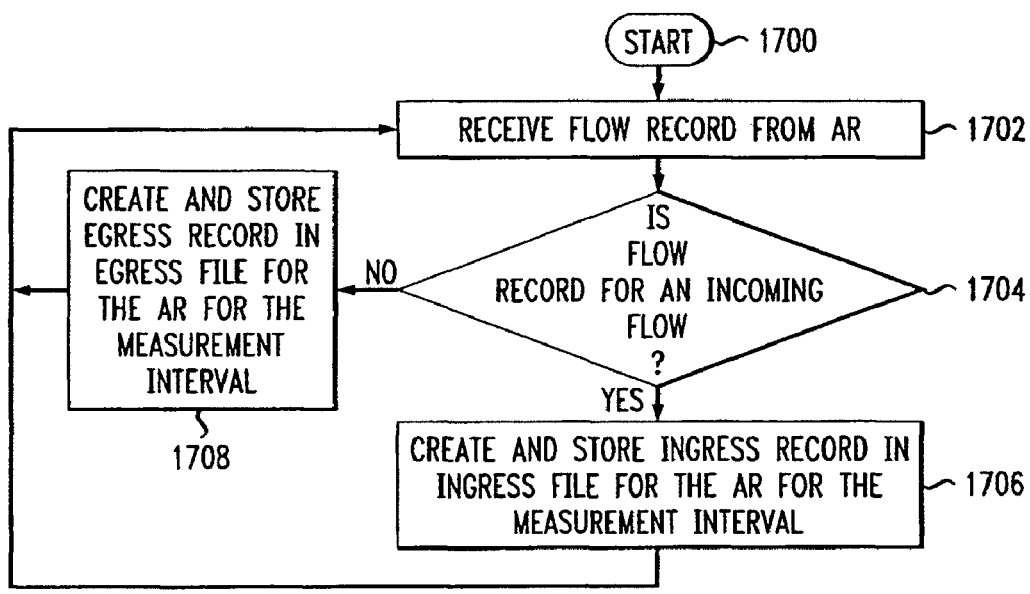
FIGS. 17-18 are flowcharts for the Filter process of the third embodiment.

FIG. 17 shows the flowchart for the enhanced Filter 708. Execution starts (step 1700). and a flow record is received from an AR (step 1702). A test is done to determine if this is an incoming flow (step 1704). This is done by using data from the flow record (viz. incoming and outgoing interface index) and interfaces.xml. If it is an incoming flow, an ingress record is created and stored in an ingress file for the AR for the measurement interval (step 1706). If it is not an incoming flow, an egress record is created and stored in an egress file for the AR for the measurement interval (1708).

Figure 18:
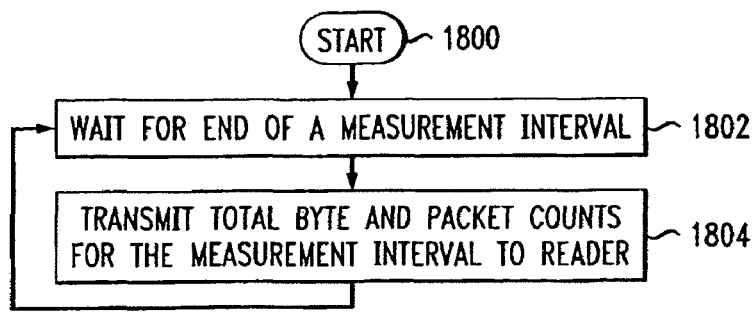

FIG. 18 also shows the flowchart for the enhanced Filter 708. Execution starts (step 1800), and the system waits for the end of a measurement interval (step 1802). The total byte and packet counts for each ingress and egress file for the interval are transmitted to the Reader 714 (step 1804). Execution proceeds to step 1802.

Figure 19:
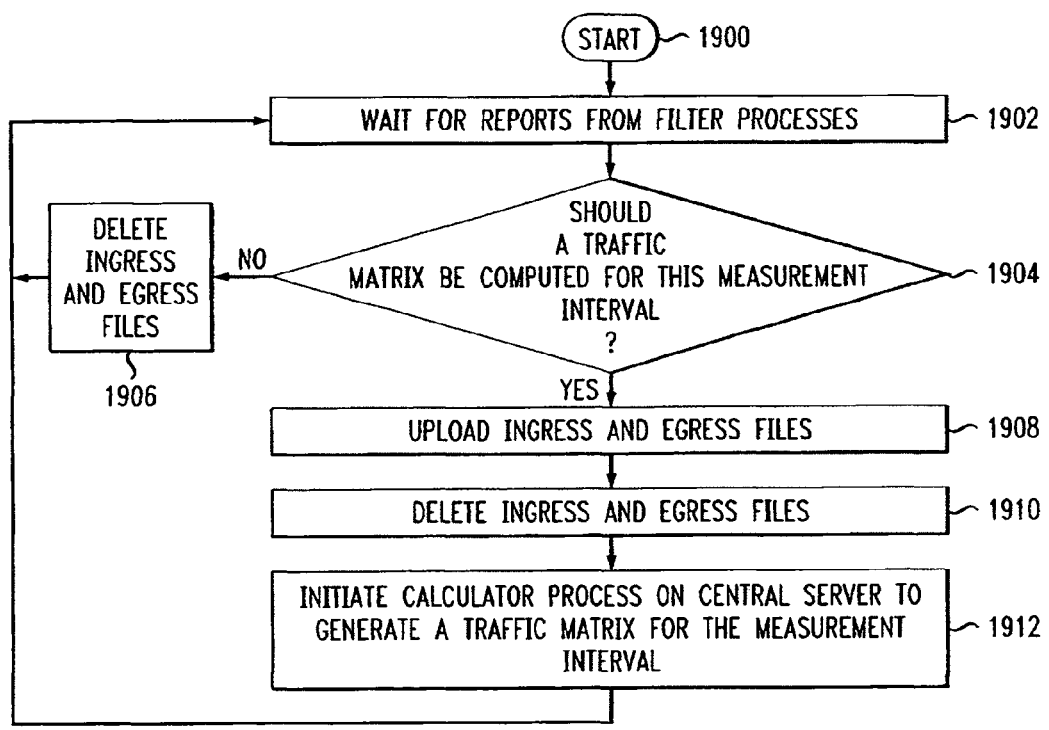
FIG. 19 is a flowchart for the Reader process of the third embodiment.

FIG. 19 shows the flowchart for the enhanced Reader 714. Execution begins (step 1900), and the software waits for reports from each Filter 708 (step 1902). A decision is made to determine if a traffic matrix should be calculated for the measurement interval (step 1904). As previously described, a variety of factors may be used to make this decision. If a traffic matrix is not being calculated, the ingress and egress files for that interval are deleted on the Record Collector 212 (step 1906). If a traffic matrix is being calculated, the ingress and egress files for the interval are uploaded to the Capacity Planning Server (step 1908). The files are then deleted from the Record Collector 220 (step 1910). A Calculator 718 is initiated to generate a traffic matrix for the interval (step 1912). The software then waits for more reports from the filter processes (step 1902).

Figure 20:
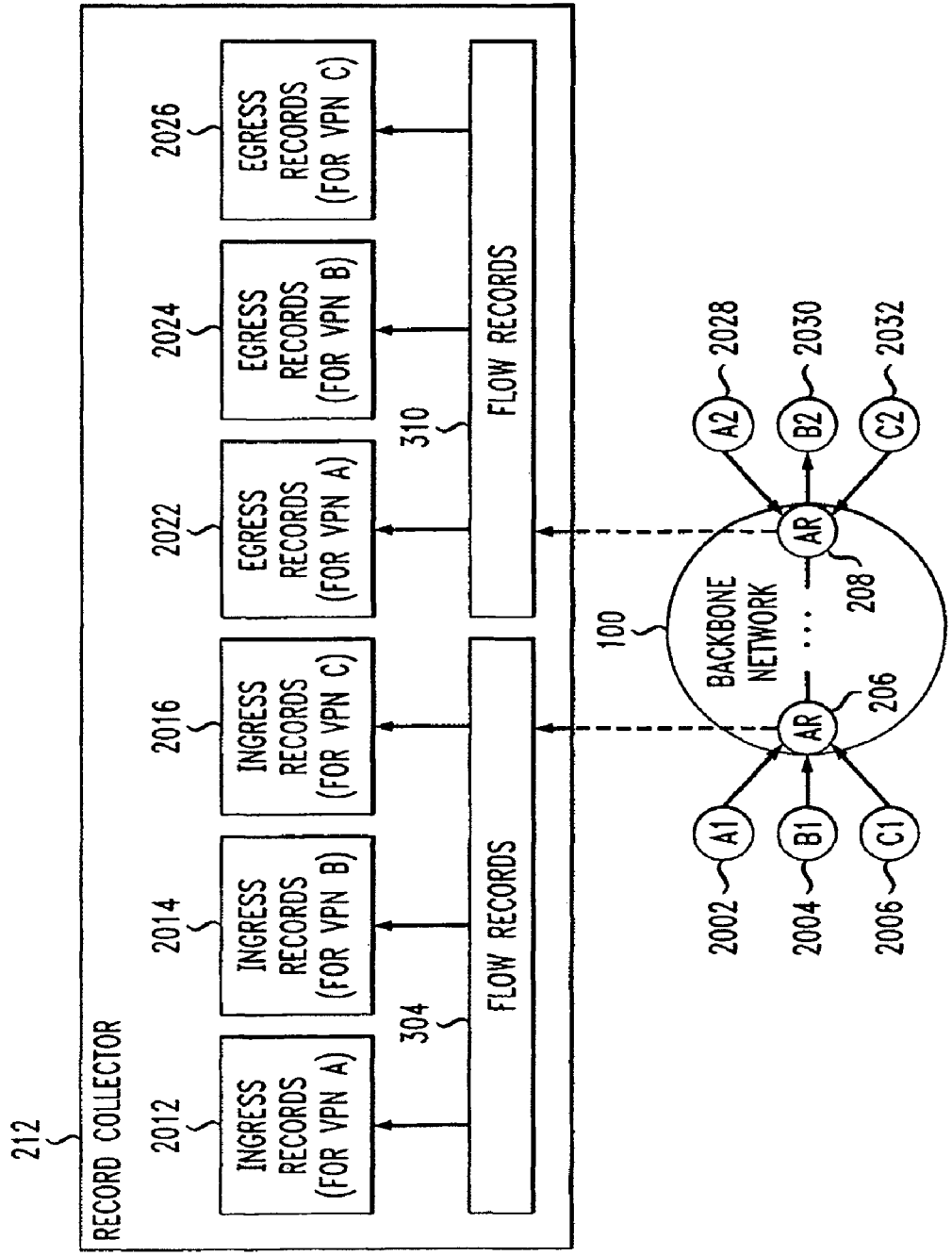
FIG. 20 shows generation of ingress and egress records for the fourth embodiment.

A fourth embodiment of this invention calculates traffic matrixes for virtual private networks (VPNs). FIG. 20 shows a sample configuration with three VPNs named A-C. Each VPN consists of two sites (e.g. A1 2002 and A2 2028 for VPN A). Site A1 2002 connects to site A2 2028 through the backbone network 100. Sites B1 2004 and C1 2006 connect to sites B2 2030 and C2 2032, respectively. Note that VPNs may use overlapping address spaces. Therefore, the algorithms described for the previous embodiments require enhancements in order to compute traffic matrixes for VPNs. These enhancements are described in the following paragraphs.

Consider a flow from A1 2002 to A2 2028. AR 206 generates flow records 304 for flows that pass through it. Each of these records identifies the input interface for its flow. The interfaces.xml indicates the VPN that is associated with this interface. The flow record is processed to create an ingress record 2012 for VPN A.

Similarly, AR 208 generates flow records 310 for flows that pass through it. Each of these records identifies the output interface for its flow. This value identifies the VPN to which that flow belongs. The flow record is processed to create an egress record 2022 for VPN A.

The interfaces.xml file must be enhanced to identify the VPN to which each interface belongs. A sample is shown in the following listing. The identifier for each external interface is followed by a string that names the VPN. Consider the AR named Palo Alto. The external interfaces with SNMP indexes equal to 1, 3, 5, and 7 are associated with VPN A, VPN B, VPN C, and VPN D, respectively. Similarly, the external interfaces for the Santa Clara AR with SNMP indexes equal to 1, 2, 3, and 4 are associated with VPN B, VPN B, VPN C, and VPN A, respectively. The external interfaces for the San Jose AR with SNMP indexes equal to 10, 11, 12, and 13 are associated with VPN C, VPN A, VPN B, and VPN D, respectively.

```
<interfaces>
    <access-router>
        <access-router-name/>Palo Alto
        <external-interfaces/>1 (VPN A), 3 (VPN B),5 (VPN C),
        7 (VPN D)
    </access-router>
    <access-router>
        <access-router-name/>Santa Clara
        <external-interfaces/>1(VPN B), 2 (VPN B), 3 (VPN C),
        4 (VPN A)
    </access-router>
    <access-router>
        <access-router-name/>San Jose
        <external-interfaces/>10 (VPN C), 11 (VPN A), 12
        (VPN B), 13 (VPN D)
    </access-router>
</interfaces>
```

Figure 21:
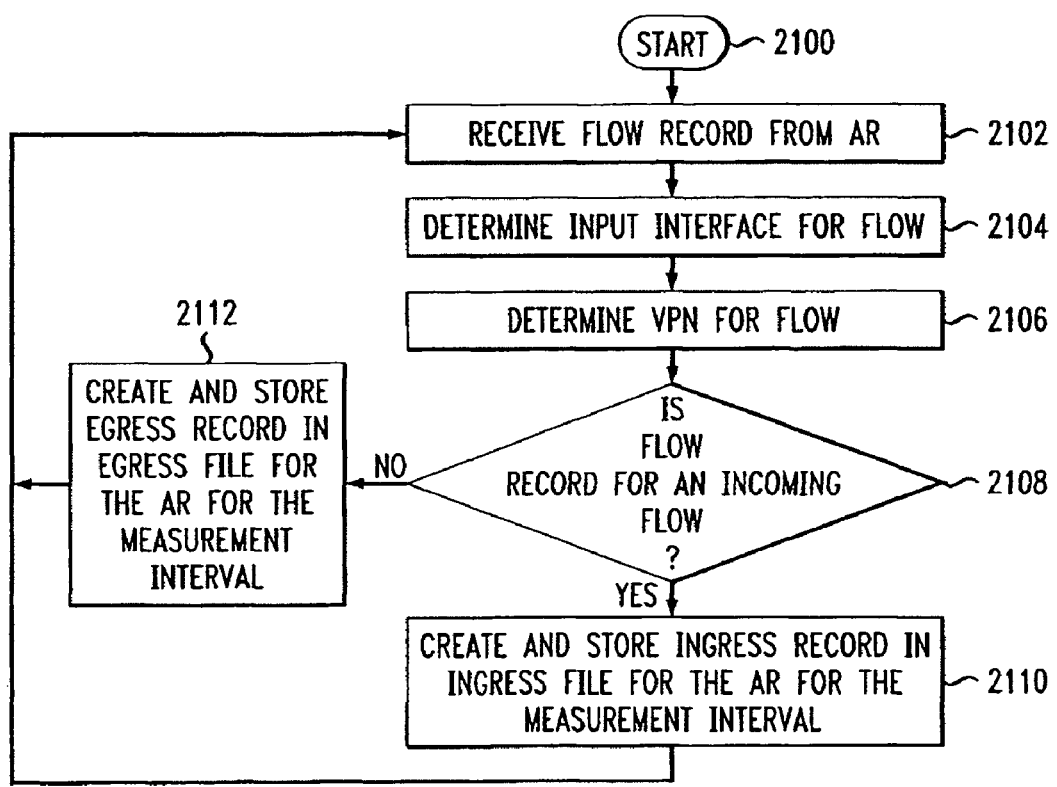
FIG. 21 is a flowchart for the Filter process of the fourth embodiment.

FIG. 21 shows the flowchart for the enhanced Filter 708. Execution starts (step 2100), and a flow record is received from an AR (step 2102). The input interface for the flow is determined (step 2104). This information is included in the flow record. The VPN for the flow is determined from the input interface (step 2106). This information is obtained from the interfaces.xml file. A test is done to determine if this is an incoming flow (step 2108). If it is an incoming flow, an ingress record is created and stored in an ingress file for the VPN (step 2110). If it is not an incoming flow, an egress record is created and stored in an egress file for the VPN (step 2112). Once the ingress or egress record is created and stored, another flow record is received from AR (step 2102). Other behavior for the Filter is similar to that previously described for FIG. 11 or 18.

The Reader 714 and Calculator 718 also require enhancements for this embodiment. The Reader 714 must upload separate files for each VPN. The Calculator 718 must generate separate traffic matrixes for each VPN. These enhancements are necessary because VPNs may use overlapping address spaces. The software modifications to implement these enhancements are obvious to those skilled in the art. For example, separate instances of the Calculator 718 may be started to process the files for each VPN. Alternatively, separate threads may be started within a Calculator 718 to process the files for each VPN.

A fifth embodiment of this invention allows generation of partial traffic matrixes. These are useful because they allow a capacity planner to focus on the most active routers in a network. For example, one can request a matrix that shows how traffic entering each AR is distributed to all other ARs. The advantage of this embodiment is that partial traffic matrixes can be computed in significantly less time than complete traffic matrixes.

The Calculator 718 for this embodiment requires egress files from all ARs. This data is necessary in order to determine the egress router for each flow. However, this embodiment requires ingress files only from those ARs that are to be included in the matrix computation. Therefore, less time is required to upload files from the Record Collectors 212. The details for these modifications to the Calculator 718 are obvious to those skilled in the art. For example, an additional configuration file can be introduced to specify the subset of ARs for which ingress files must be uploaded.

The preceding embodiments described how an access router to access router traffic matrix can be generated. However, it is also possible to calculate a traffic matrix that reports service node to service node traffic flows. This can be done for any of the preceding embodiments. The nodes.xml file indicates the service node at which each AR is located. The Calculator 718 can be enhanced to use this data and output a service node to service node traffic matrix. The details for these modifications are obvious to those skilled in the art. For example, the Calculator 718 can annotate each ingress record with the index of the egress service node. These annotated ingress records can then be processed to calculate how traffic is distributed among service nodes.

Some of the preceding embodiments may be combined together. For example, the second and third embodiments may be used to provide a system that automatically generates matrixes for peak traffic intervals from sampled flow records. The third and fourth embodiments may be used to provide a system that automatically generates matrixes for VPNs during peak traffic intervals.

Numerous other embodiments are also possible. For example, a system can automatically identify the most active ARs or service nodes during a 24-hour period and generate a partial matrix that characterizes the distribution of traffic entering and/or exiting those nodes.

A system can use historical information to minimize the time required for uploading data and computing a matrix.

Assume that a matrix is to be computed for the 15 minute interval starting at 17:00 GMT. If the system has previously computed several matrixes for this same interval on this same day of the week, it can identify those matrix elements that have the lowest byte and packet counts. In this manner, it can identify specific ingress and egress files that need not be uploaded. The matrix elements can be estimated based on an average of the stored values.

The preceding sections of this specification defined matching ingress and egress records as those having identical values for source and destination addresses. Additional elements such as type-of-service may also be included in the matching algorithm. This is useful if the network uses a technology such as MPLS to perform traffic engineering. In such a configuration, the path followed by a flow is determined not only by the destination address but also by the type-of-service.

The Filter 708 is enhanced to include the type-of-service in egress records. The Calculator 718 is enhanced to calculate key values by concatenating source address, destination address, and type-of-service.

While the invention has been described with reference to specific embodiments, modifications and variations of the invention may be constructed without departing from the scope of the invention that is defined in the following claims.

What is claimed is:

1. A method for a server to calculate access router to access router traffic matrixes by using ingress and egress files derived from flow records, each ingress file comprising a plurality of ingress records in which each ingress record represents an incoming flow, each egress file comprising a plurality of egress records in which each egress record represents an outgoing flow, comprising:
   identifying ingress records in the ingress files and egress records in the egress files that match; and
   calculating a traffic matrix using the ingress records and egress records that are matched, wherein the calculating the traffic matrix comprises creating a hash set for each egress file, and wherein the identifying and the calculating are performed by the server, wherein the calculating the traffic matrix further comprises:
      creating a key value by concatenating source addresses and destination addresses from an egress record;
      adding the key value to the hash set; and
      creating a second key value by concatenating source addresses and destination addresses from an ingress record.

2. The method of claim 1, wherein the calculating the traffic matrix further comprises performing a test to determine if the second key value for the ingress record exists in a hash set for an egress file.

3. The method of claim 2, wherein the calculating the traffic matrix further comprises annotating an ingress record with indexes of egress routers for a flow record.

4. The method of claim 3 wherein the calculating the traffic matrix further comprises incrementing an egress router count in the ingress record when the ingress record is annotated.

5. The method of claim 4, wherein the calculating the traffic matrix further comprises searching the hash set for every egress file for the second key value for every ingress record.

6. The method of claim 5, wherein the calculating the traffic matrix further comprises calculating traffic matrix elements by processing the ingress records that are annotated.

7. The method of claim 6, wherein the calculating the traffic matrix further comprises identifying specific elements in the traffic matrix using data from an ingress record that is annotated.

8. The method of claim 7, wherein the calculating the traffic matrix further comprises identifying specific elements by an ingress router index, egress router indexes, and a type-of-service.

9. The method of claim 8, wherein the calculating the traffic matrix further comprises adding byte and packet counts from an ingress record that is annotated to the traffic matrix elements.

10. The method of claim 1, wherein the traffic matrix is calculated using non-sampled flow records.

11. The method of claim 10, wherein the traffic matrix is calculated for a virtual private network.

12. A method for a server to calculate access router to access router traffic matrixes by using ingress and egress files derived from flow records, each ingress file comprising a plurality of ingress records in which each ingress record represents an incoming flow, each egress file comprising a plurality of egress records in which each egress record represents an outgoing flow, comprising:
   identifying ingress records in the ingress files and egress records in the egress files that match;
   calculating a traffic matrix using the ingress records and egress records that are matched, wherein the calculating the traffic matrix comprises creating a hash set for each egress file, and wherein the identifying and the calculating are performed by the server, wherein the traffic matrix is calculated using sampled flow records;
   using data from the traffic matrix to compute a distribution matrix;
   post-processing the traffic matrix; and
   outputting the traffic matrix.

13. The method of claim 12, wherein the post-processing the traffic matrix further comprises determining a total bytes and packets for each row of a plurality of rows of the traffic matrix.

14. The method of claim 13, wherein the post-processing the traffic matrix further comprises dividing the bytes and packets for each element in the traffic matrix by the totals computed for a row containing the element.

15. The method of claim 12, wherein the traffic matrix is calculated for a virtual private network.

16. An apparatus for calculating access router to access router traffic matrixes by using ingress and egress files derived from flow records, each ingress file comprising a plurality of ingress records in which each ingress record represents an incoming flow, each egress file comprising a plurality of egress records in which each egress record represents an outgoing flow, comprising:
   a server configured to:
      identify ingress records in the ingress files and egress records in the egress files that match; and
      calculate a traffic matrix using the ingress records and egress records that are matched, wherein the server is further configured to calculate the traffic matrix by creating a hash set for each egress file, wherein the server is further configured to calculate the traffic matrix by:
         creating a key value by concatenating source addresses and destination addresses from an egress record;
         adding the key value to the hash set; and
         creating a second key value by concatenating source addresses and destination addresses from an ingress record.

* * * * *